US009646219B2

(12) United States Patent
Baum et al.

(10) Patent No.: US 9,646,219 B2
(45) Date of Patent: May 9, 2017

(54) LOGO PRESENCE DETECTION BASED ON BLENDING CHARACTERISTICS

(71) Applicant: ARRIS Technology, Inc., Suwanee, GA (US)

(72) Inventors: Kevin L. Baum, Rolling Meadows, IL (US); Faisal Ishtiaq, Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 58 days.

(21) Appl. No.: 14/708,549

(22) Filed: May 11, 2015

(65) Prior Publication Data

US 2015/0242698 A1 Aug. 27, 2015

Related U.S. Application Data

(62) Division of application No. 13/862,318, filed on Apr. 12, 2013, now Pat. No. 9,058,522.

(60) Provisional application No. 61/799,196, filed on Mar. 15, 2013.

(51) Int. Cl.
*G06K 9/46* (2006.01)
*G06K 9/00* (2006.01)
*G06K 9/32* (2006.01)

(52) U.S. Cl.
CPC .......... *G06K 9/46* (2013.01); *G06K 9/00744* (2013.01); *G06K 9/3266* (2013.01); *G06K 2009/4666* (2013.01); *G06K 2209/25* (2013.01)

(58) Field of Classification Search
None
See application file for complete search history.

(56) References Cited

U.S. PATENT DOCUMENTS

| 7,194,032 | B1 * | 3/2007 | Easwar | H04N 19/48 375/240.12 |
| 7,567,259 | B2 * | 7/2009 | Winger | H04N 9/76 345/422 |
| 8,175,413 | B1 | 5/2012 | Loffe et al. | |
| 9,165,203 | B2 * | 10/2015 | McCarthy | H04N 19/17 |

(Continued)

OTHER PUBLICATIONS

M. Sugano, et al., "Lightweight TV logo recognition based on image moment", Proceedings of the International Conference on Multimedia, Jan. 1, 2010, p. 943.

(Continued)

*Primary Examiner* — Feng Niu
(74) *Attorney, Agent, or Firm* — Thomas A. Ward

(57) ABSTRACT

A video processing system detects an overlay image, such as a logo, in a picture of a video stream, the overlay for example being a broadcaster's logo. The detection is based on evaluation of blending characteristics of a picture frame. The method of detection of an overlay defines first and second areas within the image, the first and second areas being non-overlapping. Next an alpha-blended value is calculated for the mean color value of the second area with an overlay color value. Then, if the mean color value of the first area is closer to the alpha-blended value than it is to the mean color value of the second area, the overlay can be indicated as detected and defined within the picture. Detection of the overlay can be used to identify an owner of the video, or detect when a scene change such as a commercial occurs.

8 Claims, 15 Drawing Sheets

(56) References Cited

U.S. PATENT DOCUMENTS

| | | | | |
|---|---|---|---|---|
| 2007/0132784 | A1* | 6/2007 | Easwar | H04N 19/48 |
| | | | | 345/629 |
| 2007/0189615 | A1* | 8/2007 | Liu | G06K 9/38 |
| | | | | 382/232 |
| 2007/0222790 | A1* | 9/2007 | Winger | H04N 9/76 |
| | | | | 345/592 |
| 2008/0205753 | A1* | 8/2008 | Chen | G06K 9/325 |
| | | | | 382/165 |
| 2008/0240562 | A1 | 10/2008 | Fukuda et al. | |
| 2010/0166257 | A1 | 7/2010 | Wredenhagen | |

OTHER PUBLICATIONS

E. Mikhail, et al., "Automatic Logo Removal for Semitransparent and Animated Logos", Proceedings of the Graphicon, Sep. 26, 2011.

A. Dos Santos, et al., "Real-Time Opaque and Semi-Transparent TV Logos Detection", Proceedings of the 5th Annual International Information and Telecommunication Technologies Symposium, Dec. 6, 2006.

Y. Zhong, et al., "Automatic Caption Localization in Compressed Video", IEEE Transactions on Pattern Analysis and Machine Intelligence, vol. 22, No. 4, Apr. 2000, pp. 385-392.

N. Ozay, et al., "Automatic TV Logo Detection and Classification in Broadcast Videos", 17th European Signal Processing Conference (EUSIPCO 2009), Aug. 14-28, 2009, pp. 839-843.

A. Albiol, et al., "Detection of TV Commercials", IEEE ICASSP 2004, 4 pgs.

A. Ekin, et al., "Temporal Detection and Processing of Transparent Overlays for Video-Indexing and Enhancement", Proceedings of the 13th European Signal Processing Conference, Sep. 4-8, 2005, 4 pgs.

Wang, et al., "A Robust Method for TV Logo Tracking in Video Streams", Proceedings of the IEEE International Conference on Multimedia and Expo, 2006, pp. 1041-1044.

* cited by examiner 1412
1411

1422
1421

1432
1431

LOGO PRESENCE DETECTION BASED ON BLENDING CHARACTERISTICS

CLAIM FOR PRIORITY

This Application is a Divisional of U.S. patent application Ser. No. 13/826,318, filed Apr. 12, 2013, the entirety of which is incorporated herein by reference.

BACKGROUND

Technical Field

The present invention generally relates to the field of video processing, and more particularly to identifying images and/or regions of images having blended graphics.

Related Art

Broadcast television signals exemplify image frames that can include overlaid graphics elements, such as logos. Knowledge of the presence or absence of such overlaid graphics can be meaningful to systems and/or processes that relate to such image frames. For example, a broadcaster may overlay (superimpose) their company logo in the lower-right corner of program image frames to indicate that the program was received from their transmission facilities.

In many applications, a graphic such as a logo is imposed (i.e., overlaid) on a first image; the combined image shows a visual combination of the graphic with the first image. In some logo designs, the visual combination may have an attribute of transparency. The first image may be visible through the imposed graphic to some extent in the combined image. In a combined image, in the vicinity of an imposed graphic, the data values of the combined image can be a combination of contributions from both the first image and the graphic. Such a combined image, especially with an attribute of transparency, can be referred to as an overlay-blended graphic.

It is desirable to continue to provide improved systems to identify the presence or absence of graphics such as logos in a combined image.

SUMMARY

Embodiments of the present invention provide a video processing system and method for detection of an overlay in a picture of a video stream, the overlay for example being a broadcaster's logo. The detection is based on evaluation of blending characteristics of a frame, or regions of a frame or frames. In some embodiments, video parameters and encoding and decoding processes can be modified to augment downstream viewing characteristics in response to the detection or absence of an overlay, such as a logo in pictures of a stream.

A method of detection of an overlay in an image in one embodiment first defines first and second areas within the image, the first and second areas being non-overlapping and the second area supporting an overlay. Next an alpha-blended value is calculated for the mean color value of the second area with an overlay color value. Then, if the mean color value of the first area is closer to the alpha-blended value than it is to the mean color value of the second area, then the following steps are performed: (1) an overlay area is defined comprising at least one pixel within the first area; and (2) an action is selected from the group including: displaying a border around the overlay area, setting an indicator value that an overlay area has been found, providing a mask of the overlay area, influencing parameters to be used when encoding at least the overlay area, and causing an encoder to target a higher quality of encoded video output for the overlay area.

Using embodiments of the present invention, downstream video processing can be optimized, based on the identification of the presence of a particular overlay, such as a logo, at a specific location within specific images. For example, the encoder can use the processed information to adjust encoding parameters, such as bit rate, in response to per-pixel or per-area indications of the presence of a specified overlay. Absence of a detection of an overlay can further help identify a commercial break inserted into a program stream. The presence of an overlay can further help to identify specific programs and/or channels.

BRIEF DESCRIPTION OF THE DRAWINGS

Further details of the present invention are explained with the help of the attached drawings in which:

FIGS. 14a-14e depicts another example input image, and first and second processed images;

DETAILED DESCRIPTION

Figure 1:
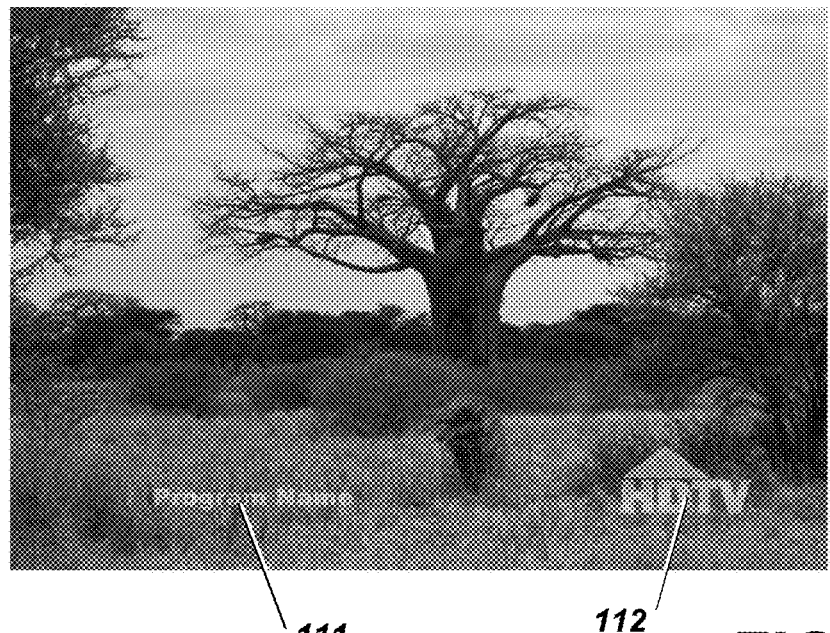
FIG. 1 depicts an example image, the image having blended graphics.

FIG. 1 depicts an example image, the image having overlay-blended graphics. A proprietary rights logo 112 and a graphic providing program identification 111 are visible within the image. Notably, both the rights logo 112 and the program identification element 111 exhibit an attribute of transparency. That is, some features of a first image corresponding to program material are at least partially visible through the graphic elements 111 and 112.

Figure 2:
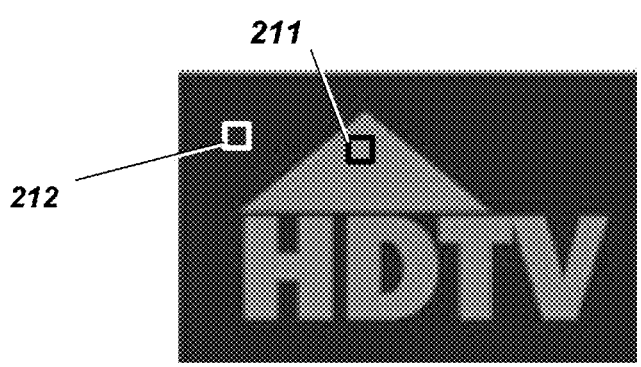
FIG. 2 depicts regions of an example image, the image having blended graphics.

FIG. 2 depicts regions of an example image, the image having overlay-blended graphics (e.g., an overlaid logo). The region is an exemplary portion of a combined image, showing the vicinity of a graphic, that is, a region that encompasses a recognizable logo. Region 211 indicates a small region within the shape of the recognizable logo. Region 212 indicates a small region that is near to the logo, but is not within the logo.

$$P(i,j)=(1-\alpha)P_b(i,j)+\alpha P_l(i,j) \qquad \text{Eqn. 1}$$

The value of an image pixel within an overlay-blended graphic can be modeled according to Eqn. 1. P(i,j) represents the value of an overlay-blended pixel, such as that shown by 211, at a location (i, j) within an image frame. The location (i, j) can represent the $i^{th}$ row and $j^{th}$ column of a two-dimensional array of pixel locations.

In some typical embodiments, pixel values as described herein can correspond to a luminance component value as is well known in the related arts. Use of the luminance component alone is sufficient for the purpose of logo presence/absence determination in many applications, and results in reduced computational complexity as compared to using multiple components, such as RGB (i.e., red, green, and blue), for the pixel value. In some embodiments a typical range for such luminance values can range from 0 to 1, corresponding respectively to a specified minimum luminance measure and a specified maximum luminance measure. In some embodiments a minimum to maximum range in an embodiment can respectively correspond to values coded as 0 to 255, which can advantageously correspond to 8-bit coding of the values. Ranges and coding for other parameters herein described can be implemented as is well known in the related arts. Although some specific embodiments utilizing luminance values for pixel values are described herein, the systems and methods herein disclosed are not necessarily so limited. Alternative embodiments utilizing any other known and/or convenient image pixel representation components and/or measures are understood to be within the scope and spirit of the described embodiments. If multiple components are chosen to represent a pixel value, the equations and processes of embodiments of the present invention can be applied to one of the multiple components, or can be applied to more than one of the components or some combination of the components.

The overlay-blended pixel value P is a blend of contributions from a logo pixel value and $P_l$, and a background pixel value $P_b$, according to the value of the blending parameter α. The blending parameter can also be referred to as an overlay-blending parameter, since it relates to overlaying a graphic onto an image. In some typical embodiments, each of $P_l$, $P_b$, α can have a range of 0 to 1. The logo pixel value $P_l$ is representative of an imposed graphic element such as a logo, and the background pixel value $P_b$ is representative of a first image upon which the graphic is imposed.

Embodiments of the present invention can analyze an image to determine if portions of the image have characteristics that are consistent with the presence of an overlay-blended graphic object. In some embodiments, the analysis is based on the properties of the model of Eqn. 1. As $P_b(i,j)$ is not accessible in the already-combined image, embodiments of the invention provide an approximation by using a spatially separate pixel from the image that is preferably nearby, such as indicated in Eqn. 2.

$$\hat{P}_b(i,j)=P(i',j') \qquad \text{Eqn. 2}$$

FIG. 2 depicts an example with an overlay-blended logo. In this example, a logo with nearly-maximum luminance value (prior to blending) was overlay-blended on a dark image, resulting in an overlay-blended logo that is much darker than the maximum luminance value (luminance much less than maximum). For the overlay-blended pixel P(i,j) in the region 211 within the logo, $P_b(i,j)$ can be approximated by a nearby pixel in the Region 212, (i',j'), located outside the logo. Under this approximation, $P_b(i,j)$ becomes $\hat{P}_b(i,j)=P(i',j')$, and the model of Eqn. 1 becomes:

$$P(i,j) \approx \hat{P}(i,j) = (1-\alpha)\hat{P}_b(i,j) + \alpha P_l(i,j) \qquad \text{Eqn. 3}$$

Assuming that $P_l(i,j)$ and α are known, Eqn. 3 can be evaluated. In some cases, $P_l(i,j)$ and α may not be directly known. However, it has been observed that several broadcasts use approximately maximum luminance (e.g., 255 for an 8-bit representation) for $P_l(i,j)$ and often use an α in the range of 0.3-0.5. Thus, when $P_l(i,j)$ and α are not known, it is possible to use approximate values such as $P_l(i,j)$="maximum-value" and α=0.4. Alternatively, sample images from a broadcast containing an overlay-blended logo can be captured and the logo region of the images can be further analyzed to provide estimates of $P_l(i,j)$ and α.

An overlay-blended graphic (e.g., an overlaid logo) presence criterion can be satisfied if the value of P(i,j) is a better match to the value of $\hat{P}(i,j)$ than it is to the value of $\hat{P}_b(i,j)$. That is, an overlay-blended graphic presence is indicated at position (i,j) if P(i,j) is in a sense closer to the value of $\hat{P}(i,j)$ than it is to the value of $\hat{P}_b(i,j)$.

A overlay-blended graphic presence indicator $C_p$ can represent the result of evaluating the criterion. In some embodiments, the logo presence criterion can be evaluated as the logic equation:

$$C_p=\text{If}(|\hat{P}(i,j)-P(i,j)|<|P(i,j)-\hat{P}_b(i,j)|) \qquad \text{Eqn. 4}$$

Figure 3:
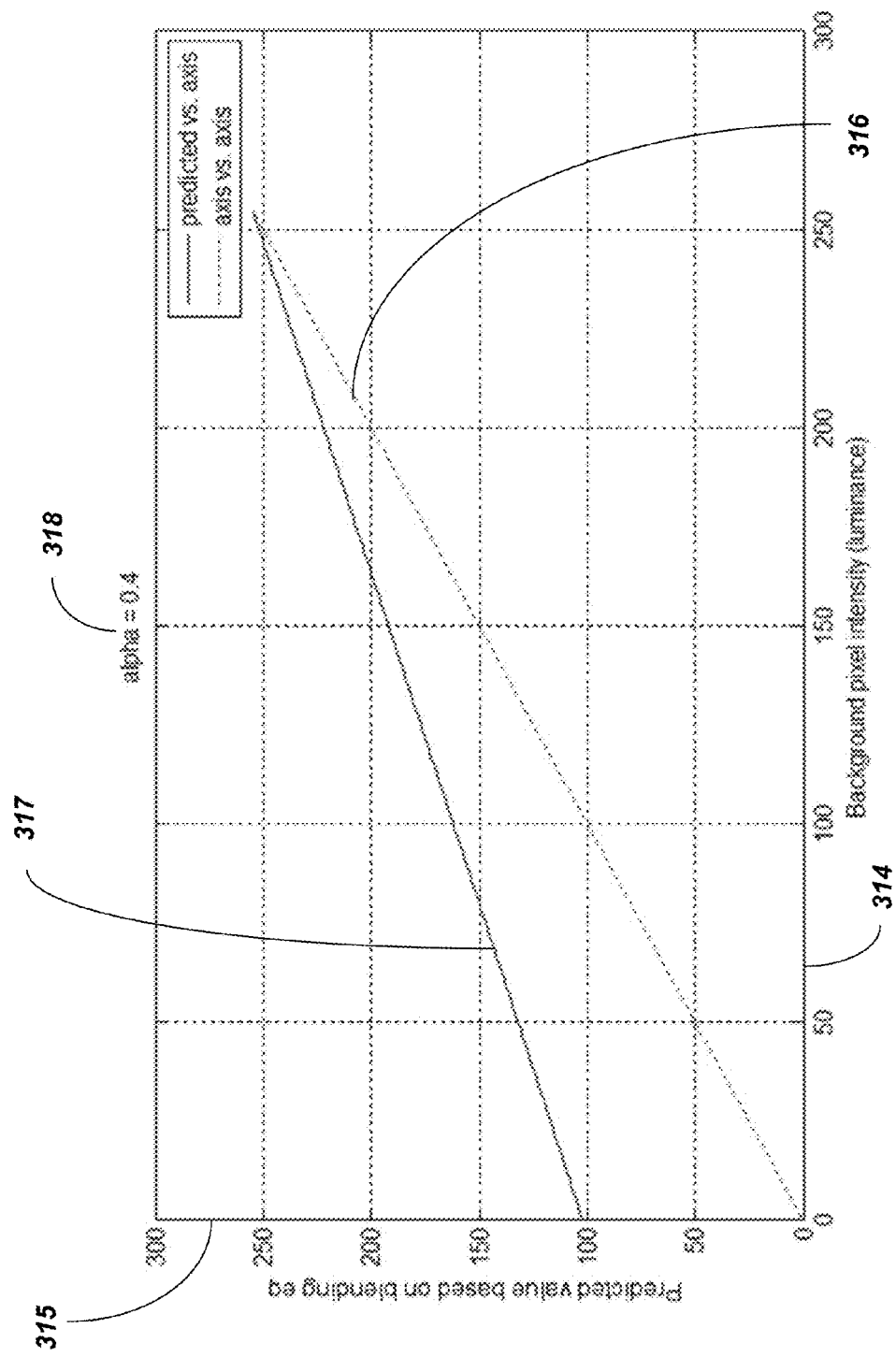
FIG. 3 depicts an exemplary comparative graph of background pixel luminance relative to predicted blended pixel luminance.

FIG. 3 depicts an exemplary comparative graph of background pixel luminance relative to blended pixel luminance using Eqn. 1 or predicted blended pixel luminance using Eqn. 3. In the embodiment depicted in FIG. 3, the values on the x-axis 314 can represent the luminance of the background pixel, $P_b$ (Eqn. 1) or $\hat{P}_b$ (Eqn. 3), and the values on the y-axis 315 can represent the luminance of the overlay-blended pixel, P (Eqn. 1) or predicted overlay-blended pixel $\hat{P}$ (Eqn. 3). In the embodiment shown in FIG. 3, the lower line 316 represents a background pixel value with no blended component (alpha set to zero) wherein the blended pixel value is equal to the background pixel luminance value, and the upper line 317 represents a overlay-blended pixel, P (Eqn. 1) or predicted overlay-blended pixel $\hat{P}$ (Eqn. 3), using an α value 318 of 0.4 and assuming that the luminance value of $P_l(i,j)$ is 255 or white. FIG. 3 graphically demonstrates that as the value of the background pixel becomes higher or becomes brighter (along horizontal axis 314), the smaller the difference between the blended value using Eqn. 1 (or the predicted value using Eqn. 3), and the reference background pixel component line 316 generated without using blending.

Some embodiments can use the way the alpha-blended value varies with the value of the background pixel to form the predicted pixel value $\hat{P}$. From FIG. 3, Eqn. 1, or Eqn. 3, it can be determined that as the value of the background pixel increases or becomes brighter (along horizontal axis 314), the difference between the background and blended pixel values decreases in a linear fashion. Also, it can be determined that the blended pixel value is greater than or equal to the background pixel value. These characteristics can be used to form a predicted blended pixel value for a pixel in one region from a pixel in another region. Note that FIG. 3 is plotted for a $P_l$ of 255. For smaller values of $P_l$, the blended pixel curve can cross the axis vs. axis curve 316 and be below it for large background pixel values. In this case, the predicted pixel value will still be larger than the background pixel value for background pixel values less than a certain value, but less than the background pixel values for background pixel values above the certain value. The certain value can be referred to as a crossover value. Above the crossover value, the difference in value between the blended and background pixels can increase in a linear fashion.

In some embodiments, the satisfaction of an overlay-blended graphic presence criterion can be subject to an additional tolerance constraint. The further constraint can be expressed as:

$$\hat{P}(i,j) < (1-\alpha)\hat{P}_b(i,j) + \alpha P_l(i,j) + \text{tolerance}(\hat{P}_b)$$

$$P(i,j) - [(1-\alpha)\hat{P}_b(i,j) + \alpha P_l(i,j)] < \text{tolerance}(\hat{P}_b) \quad \text{Eqn. 5a}$$

When this additional constraint is used, both Eqn. 5a and the If statement of Eqn. 4 must evaluate as "true" (which in some embodiments can be represented as a numerical value of 1) for the overlay-blended graphic presence criterion $C_p$ to indicate a positive (e.g., "true" or 1) output. This additional constraint helps prevent a false-positive indication when the pixel at position (i,j) is not overlay-blended, but has a very high luminance value as compared to the pixel at position (i', j'). The additional constraint can alternatively be formulated with an absolute-value operation as shown in Eqn. 5b to reduce false-positive responses due to both too-high and too-low luminance values that nevertheless satisfied Eqn. 4. Excluding otherwise positive results based on failing to meet a constraint can also be referred to as redefining an overlay area.

$$|P(i,j) - [(1-\alpha)\hat{P}_b(i,j) + \alpha P_l(i,j)]| < \text{tolerance}(\hat{P}_b) \quad \text{Eqn. 5b}$$

In such embodiments, satisfaction of the overlay-blended graphic presence criterion requires that the value of P(i,j) is a better match to the value of $\hat{P}(i,j)$ than than it is to the value of $\hat{P}_b(i,j)$, and, that the applicable Eqn. 5a or 5b evaluates as true.

The value of tolerance($P_b$) can be fixed or variable. A fixed value is very simple to implement, but better performance may be obtained with a variable value. When using a variable value, it is preferable that the value of tolerance ($P_b$) decreases as the value of $\hat{P}_b$ increases. This is because a blended-overlay causes a proportionally smaller increase in luminance when the background pixel already has a high luminance value. Some embodiments use a linear function for $\hat{P}_b$ tolerance which can vary linearly from its maximum value to its minimum value as $\hat{P}_b$ increases from a minimum value in its range to a maximum value in its operating range. Considering a case where the luminance is represented in a range from 0 to 255, in some embodiments the maximum value of tolerance($P_b$) is 30 and its minimum value is 6. In some embodiments, a minimum value of $\hat{P}_b$ can correspond to black, and, a maximum value can correspond to white.

In some embodiments, this additional constraint upon the overlay-blended graphic presence criterion can advantageously prevent false-positive detection from a non-blended bright object.

Some additional non-limiting examples of introducing a tolerance value, tolerance($\hat{P}_b$), are as follows:

$$P(i,j) < (1-\alpha)\hat{P}_b(i,j) + \alpha P_l(i,j) + \text{tolerance}(\hat{P}_b) \quad \text{Equation 5c:}$$

$$P(i,j) > (1-\alpha)\hat{P}_b(i,j) + \alpha P_l(i,j) - \text{tolerance}(\hat{P}_b) \quad \text{Equation 5d:}$$

By way of non-limiting examples:
If P(i, j) is closer to $(1-\alpha)\hat{P}_b(i, j) + \alpha P_l(i, j)$, then the detector output can be 1 as long as:

$$P(i,j) < (1-\alpha)\hat{P}_b(i,j) + \alpha P_l(i,j) + \text{tolerance}(\hat{P}_b)$$

Example: tolerance($\hat{P}_b$) varies linearly from 30 to 6 as $\hat{P}_b$ increases from 0 (black) to 255 (white)

Additionally by way of non-limiting example, to reduce the likelihood of a false positive result the following can be employed.
If P(i, j) is closer to $(1-\alpha)\hat{P}_b(i, j) + \alpha P_l(i, j)$, then the detector output will be 1 as long as:

$$P(i,j) > (1-\alpha)\hat{P}_b(i,j) + \alpha P_l(i,j) - \text{tolerance}(\hat{P}_b)$$

Example: tolerance($\hat{P}_b$) varies linearly from 30 to 6 as $\hat{P}_b$ increases from 0 (black) to 255 (white)

Additionally in some embodiments both upper and lower boundaries can be combined, as shown below:
If P(i, j) is closer to $(1-\alpha)\hat{P}_b(i, j) + \alpha P_l(i, j)$, then the detector output will be 1 as long as:

$$P(i,j) < (1-\alpha)\hat{P}_b(i,j) + \alpha P_l(i,j) + \text{tolerance}(\hat{P}_b); \text{ AND}$$

$$P(i,j) > (1-\alpha)\hat{P}_b(i,j) + \alpha P_l(i,j) - \text{tolerance}(\hat{P}_b)$$

Figure 4:
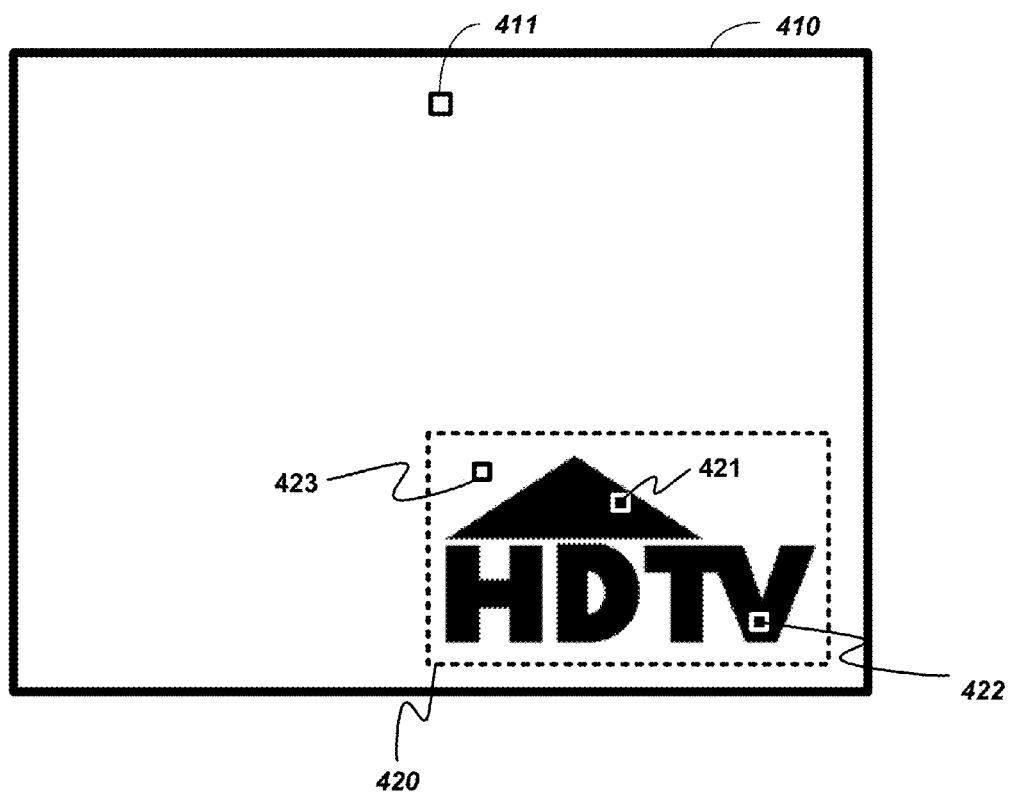
FIGS. 4 depicts regions of an image, the image having blended graphics.

FIG. 4 depicts regions of an image in a frame 410, the image having overlay-blended graphics. FIG. 4 does not show the actual pixel values of the image, but rather only serves as a logical reference for the different regions of the image. For convenience in this representation, locations where logo pixels were overlay-blended onto the image correspond to black shown within the frame, and all other locations within the frame correspond to white.

A cutout region 420 is also shown within the frame of FIG. 4. The cutout region 420 contains a recognizable logo, with regions 421 and 422 corresponding to locations with logo presence. Region 423 is located within the cutout, but outside the shape of the logo, thus corresponding to a location with logo absence. Notably, as shown in the example, an overlay-blended graphic can have a complex geometry and/or combination of shapes such that overlay-blended graphic presence and absence do not necessarily correspond to connected and/or contiguous regions within the combined image. A set of information specifying the shape and location of a graphic element, such as a logo, can be referred to as a logo mask.

In operation, downstream processes can be optimized, based on the identification of the presence of a particular proprietary rights logo at a specific location within specific images. For example, an encoder of an image stream can adjust encoding parameters, such as bit rate, in response to per-pixel or per-area indications of the presence of a specified proprietary logo. Such bit-rate adjustments can optimize the downstream viewing characteristics of the logo. Additionally in some embodiments, the absence of a proprietary rights logo, on a per-frame basis, can help identify a commercial break inserted into a program stream or the presence of specific logos within a frame can help to identify specific programs and/or channels.

FIG. 4 also shows a binary image with a logo mask The logo mask is represented by the black pixels of the "H"-"D"-"T"-"V" block letters and the pixels of the black-filled triangle above the letters. For convenience of display in FIG. 4, the pixels having value 1 (the logo mask) were mapped to a display color of black and the pixels having a value of 0 were mapped to a display color of white. In some embodiments, the logo mask pixels may be represented in a non-binary form, such as by the maximum luminance value or a predetermined luminance value such as $P_l$. An embodiment can make a determination as to whether or not the corresponding overlay-blended logo has been imposed on the image being analyzed. Candidate locations (i', j') for evaluating the background pixel value $\hat{P}_b$ can be any pixel locations that are specified to be outside of the logo mask. A candidate location (i, j) for both measuring an image pixel value P, and estimating an overlay-blended pixel value $\hat{P}$, can be any location that is specified to be inside the logo mask. It can be advantageous to select the (i', j') location to be close to but outside the logo mask. It can be further advantageous to invoke spatial averaging techniques in evaluating the background pixel value and/or the image pixel value.

Thus, steps of a method of practicing this embodiment, for each image frame of interest, can comprise:
- measuring an average pixel intensity for at least a portion of the pixels located inside the logo mask, thereby providing an image pixel value P;
- measuring an average pixel intensity for at least a portion of the pixels located outside the logo mask, thereby providing a background pixel value $\hat{P}_b$;
- estimating an overlay-blended pixel value $\hat{P}$, which can be according to Eqn. 3; and,
- evaluating the overlay-blended graphic presence criterion, using these P, $\hat{P}_b$, and $\hat{P}$.

The overlay-blended graphic presence criterion can be evaluated according to Eqn. 4, in some such embodiments. In some embodiments using a logo mask, a determination of whether the logo represented by the logo mask is present in the image being analyzed, is based on whether the overlay-blended graphic presence criterion is satisfied or not.

Case 1: Embodiment with a Predefined Logo Mask Available

Figure 5A:
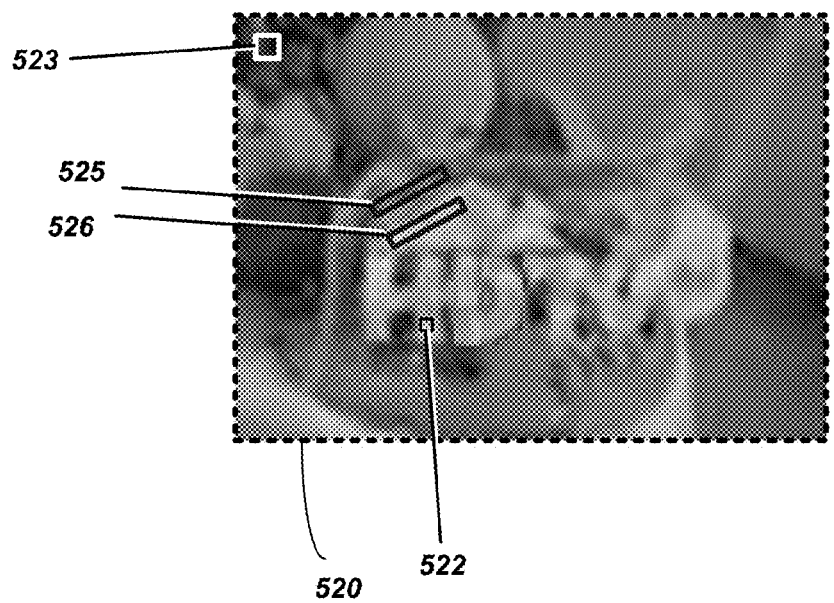
FIG. 5a-5b depict regions of images, the images having blended graphics.
Figure 5B:
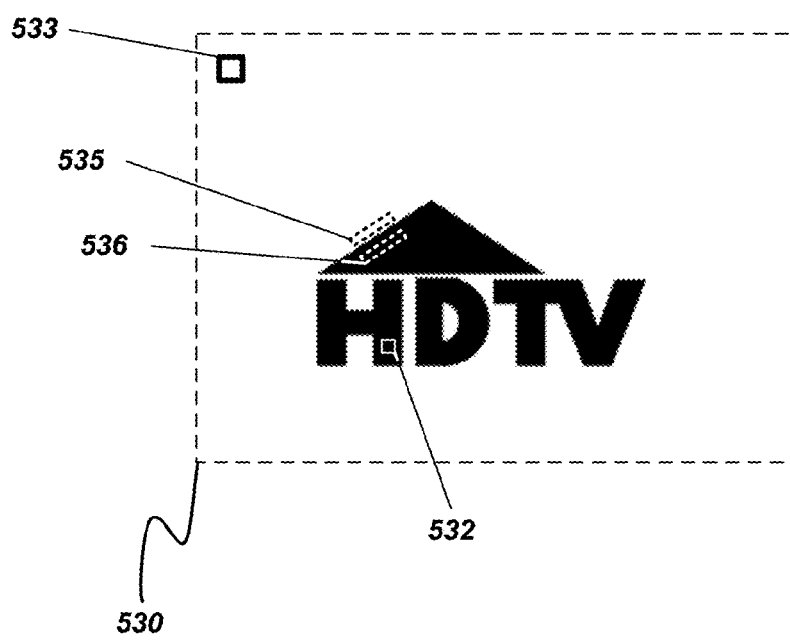

The diagrams of FIGS. 5a-5b depict Case 1 embodiments. In Case 1 embodiments, a logo mask is available. The logo mask specifies the location of pixels inside a logo. In an example embodiment, a logo mask represents the set of (i,j) locations at which corresponding logo pixels may be present, within a combined image. That is, the locations of the logo pixels within a frame are predetermined. In some embodiments, a logo mask can be represented as a portion of a binary image, the binary image having the same dimensions as the image (or image cutout) being analyzed, where the binary image has pixel values of 1 at all positions where the logo pixels may be present (the logo mask), and 0 at all other pixel locations (outside the logo mask).

In FIG. 5a, the region illustrates a cutout region of an example combined video image frame. The region of FIG. 5b represents a cutout region 530 of a combined image frame such as the image frame 410 depicted in diagram of FIG. 4, assuming that the case depicted in FIG. 4 is a case in which a logo mask is available. For convenience in FIG. 5b, maximum luminance values can correspond to black shown within a region, and minimum luminance values can correspond to white shown within a region.

Case 1: Example 1

Pixel image values corresponding to all locations within the logo mask are averaged, in order to form an image pixel value P. These locations are visible in the cutouts 530 and 520, and identifiable as the areas in which a logo shape has plainly been imposed on a first image frame. Examples of specific locations within a logo mask are shown, such as 532, 536, 522 and 526. The set of all locations within a logo mask is plainly visible as a logo comprising a filled triangle, and letters "H" "D" "T" and "V", within each cutout 530 and 520, Pixel image values corresponding to all locations within the cutout but outside the logo mask are averaged, in order to form a background pixel value $\hat{P}_b$. Area 533 within cutout 530, and, area 523 within cutout 520, depict, by way of examples, some of such locations.

Case 1: Example 2

Pixel image values corresponding to all locations within a specified region within the logo mask are averaged, in order to form an image pixel value P. In cutout 530, such a region is depicted as 'inside mask' region 536. In cutout 520, such a region is depicted as 'inside mask' region 526.

Pixel image values corresponding to all locations within a specified region outside the logo mask are averaged, in order to form a background pixel value $\hat{P}_b$. In cutout 530, such a region is depicted as 'outside mask' region 535. In cutout 520, such a region is depicted as 'outside mask' region 525.

The 'inside' and/or 'outside' regions of such an embodiment can be selected to be advantageously aligned with respect to geometric features of a known logo mask. For example, alignment with off-axis logo features can help to disambiguate between logo presence and on-axis features of background images. By way of example and not limitation, embodiments utilizing diagonally aligned 'inside mask' and 'outside mask' regions as depicted in diagram 520 can be relatively insensitive to (mis)interpreting horizontal and/or vertical edge features within a background image as indicative of logo presence.

In some embodiments, the 'inside' and/or 'outside' regions of such an embodiment can be selected based on one or more additional or alternative criteria, such as, by way of example and not limitation, a set of pixels along the edges of the mask for the 'inside' region, a set of pixels outside the mask but near the edges of the mask for the 'outside' region, a random or pseudo-random pixel selector for the 'inside' and/or 'outside' portions, uniformity and/or brightness.

Case 1: Enhanced

In additional embodiments, performance can be enhanced by combining (Case 1) Example 1 and Example 2 embodiments to more reliably detect logo presence in an image. In such additional embodiments, a logo presence criterion will be satisfied if operation of both Example 1 and Example 2 embodiments indicate logo presence.

By way of example, a sequence of operations corresponding to such additional embodiments can be described. First, a Case 1 Example 1 embodiment operates on an image. If the result of that operation indicates (positively) a logo presence within the image, a Case 1 Example 2 embodiment operates on the same image. If the result of the Case 1 Example 2 operation on the image also indicates a logo presence within the image, then the combined result of the operation indicates a logo presence within the image. In the event that the Case 1 Example 2 operation is not indicative of a logo presence, then the combined result of the sequence of operations does not indicate a logo presence.

Figure 6:
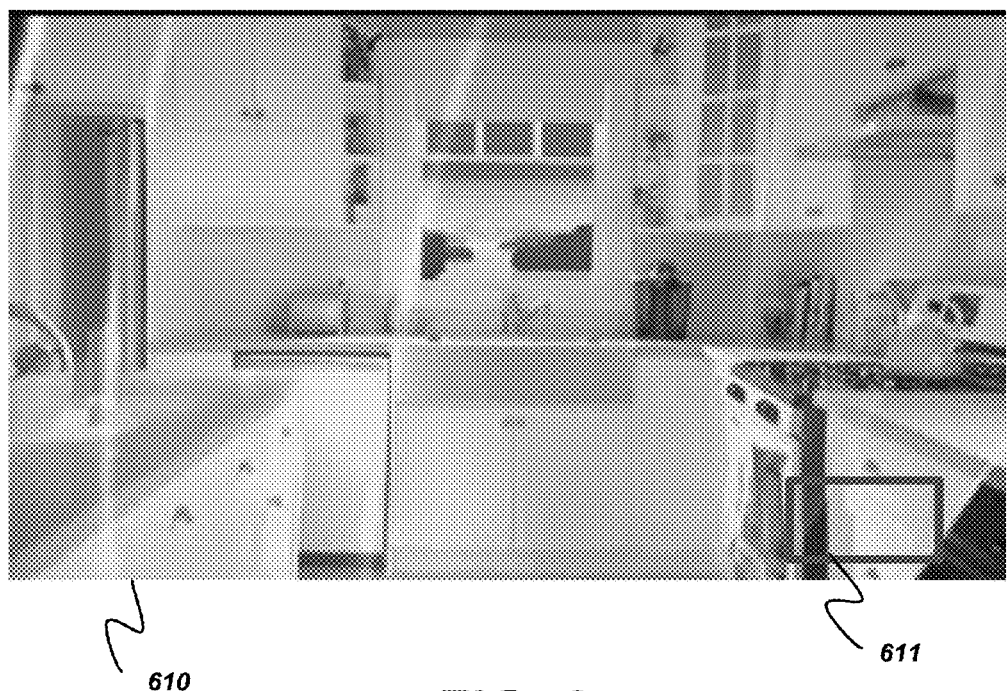
FIG. 6 depicts an example image without blended graphics.

FIG. 6 depicts an image 610 on which a Case 1 Enhanced embodiment operated. Notably, image 610 is absent an imposed graphic or logo within region 611. Region 611 comprises a very high luminance region as well as vertical edge features of a background image. The operation of a Case 1 Example 1 embodiment on the image indicated a logo presence corresponding to region 611. The operation of a Case 1 Example 2 embodiment on the image indicated no logo presence. Thus the combined operation of the Example 1 and Example 2 embodiments yields an accurate indication of no logo present. The operation of the Case 1 Enhanced embodiment can be described as eliminating or avoiding a false positive indication of logo presence.

The function of a Case 1 Enhanced embodiment, as just described, can be described as a providing a type of logo shape verification, since the Case 1 Example 2 embodiment provided a negative response when applied to a portion of the logo mask having a distinctive diagonal edge direction.

There can be additional embodiments that combine operation of more than one Example 2 embodiments, with or without combined operation of an Example 1 embodiment.

The additional Example 2 embodiments can serve to test different elements of a logo geometry or an entire logo shape.

Notably, the successfully combined result of operation of combinations of such embodiments upon the same image does not necessarily require a particular order of operations. In some embodiments, the per-embodiment indications of logo presence can be logically or otherwise combined to provide a useful result, without regard to the order or time they were provided.

Case 2: Operating Without a Pre-defined Logo Mask

Case 2 embodiments operate without accessing a predefined logo mask. Such operation can be described as 'blind detection' and in some embodiments a blending detector is used to identify logo boundaries.

Blended Transition Detector:

Embodiments of a Blended Transition Detector (BTD) are herein described. A BTD can be responsive to boundaries between background pixels and overlay-blended pixels, and other boundaries that are consistent with a transition from non-blended pixels to blended pixels. That is, a BTD can respond to features of a combined image that are consistent with characteristics of overlay-blended graphics, such as logos, that are imposed within the image.

A BTD evaluates $P(i,j)$ and $\hat{P}_b(i,j)=P(i',j')$ for one or more pixel locations $(i,j)$ in an image, where $(i,j)$ denote the (row, column) of an image pixel. In some embodiments, the BTD can evaluate pixel locations within a specified region, a predetermined set of pixel locations, every kth pixel location, a majority of pixel locations, or even all pixel locations. The location of a spatially separate pixel $(i',j')$ is spatially offset from the location of the image pixel by a specified value of $\delta$, in a specified direction D within the plane of the image.

The values of $P(i,j)$ and $\hat{P}_b(i,j)$ are employed to estimate the overlay-blended pixel value $\hat{P}(i,j)$, which can be according to Eqn. 3. The overlay-blended graphic presence criterion is evaluated, using these P, $P_b$, and $\hat{P}$, which can be according to Eqn. 4. A overlay-blended graphic presence indicator $C_p$ can thereby be assigned a value for each location $(i,j)$ within the plane of the image.

$P(i,j)$ and $\hat{P}_b(i,j)=P(i',j')$ can each be evaluated by various methods. For example, the pixel values at the locations $(i,j)$ and $(i', j')$ can be used directly. However, it may be preferable to use filtered pixel values at each position. Various filters for pixel values are known in the art and can be used with the present invention to determine filtered pixel values. One such filter can be referred to as a spatial averaging filter, which involves averaging the values of a set of preferably neighboring pixels. It can be advantageous to perform such spatial averaging in a direction essentially orthogonal to the specified direction D corresponding to a specific BTD. Notably, a variety of effective pixel filtering systems and methods are available, as are well-known in the related arts, such as by way of example and not limitation, filtering methods relating to image smoothing or to edge-detection in images. Note that a filtered value can also be referred to as a mean value or an average value, and locations $(i,j)$ and $(i', j')$ can also be considered to be from different areas of an image.

Figure 7:
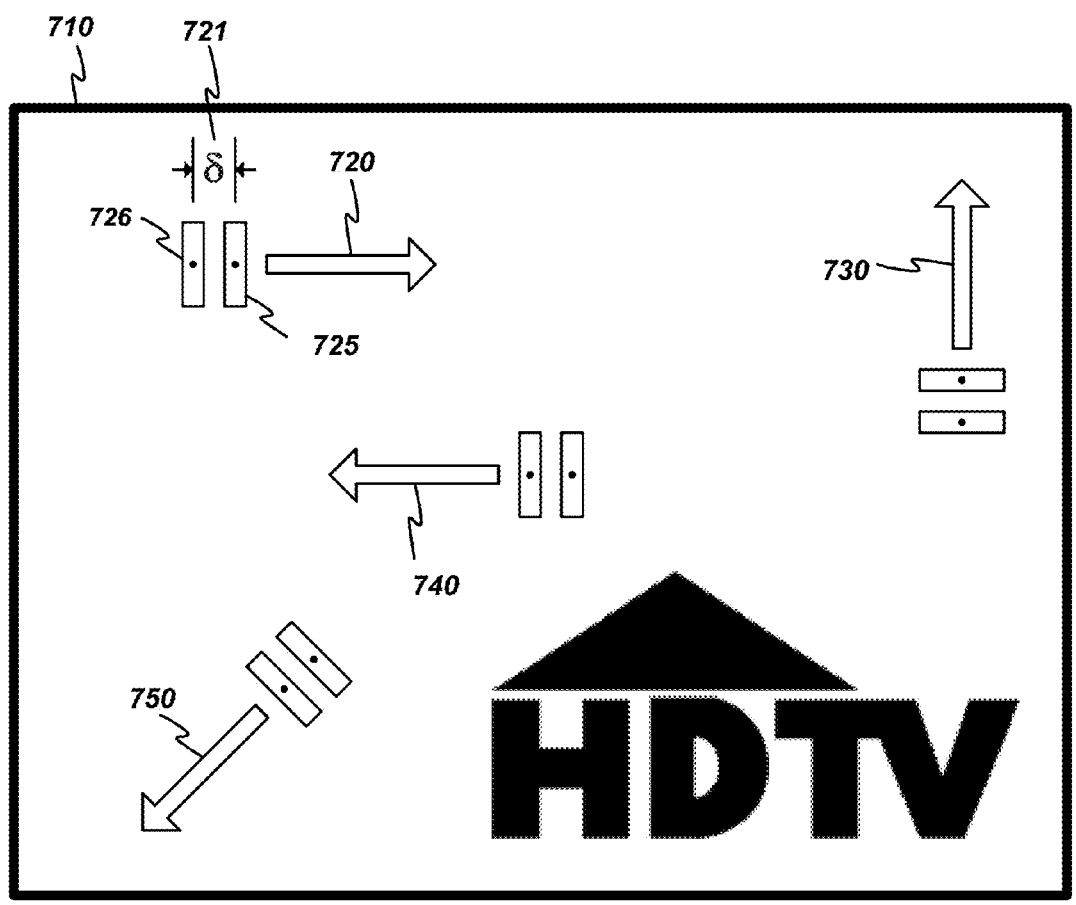
FIG. 7 depicts a blended transition detector.

FIG. 7 depicts BTD embodiments. A BTD having a horizontal direction 720 is shown within the image frame 710. Region 725 comprises a pixel location $(i,j)$ and some additional pixel locations distributed equally on either side of location $(i,j)$ and orthogonal to the direction of the BTD. Pixel value $P(i,j)$ can be a filtered pixel value that is obtained by spatial averaging of the pixels in Region 725. As an example and without limitation, region 725 may include three pixels, having locations $(i,j)$, $(i-1,j)$, and $(i+1,j)$ to provide spatial averaging in a direction essentially orthogonal to the specified direction 720.

Region 726 comprises the offset pixel location $(i',j')$ and some additional pixel locations distributed equally on either side of location $(i',j')$ and orthogonal to the direction of the BTD. The pixel location $(i',j')$ within 726 is located a specified distance $\delta$ 721 from image pixel location $(i,j)$ along the specified horizontal direction 720 corresponding to this BTD. By way of non-limiting example, in some embodiments $\delta$ can have a small value, such as 2 pixels. Pixel value $\hat{P}_b(i,j)=P(i',j')$ can be a filtered pixel value that is obtained by spatial averaging of the pixels in Region 726.

The scan of all image locations, for a BTD embodiment having a direction as depicted by horizontal direction 720 (left to right) can be described as: Let $(i,j)$ denote the (row, column) of an image pixel. Scan over every pixel location in the image. For every pixel location let $i'=i$, and $j'=j-\delta$.

The scan of all image locations for a BTD embodiment having a horizontal direction 740, which is opposite to the direction 720, can be by characterized as letting $i'=i$, and $j'=j+\delta$.

In some embodiments, the BTD can use multiple values of the spatial offset delta. By using multiple values of delta, the BTD can identify additional blended-graphic pixels. As a non-limiting example, the BTD can operate with a first delta value to identify an outline of a blended-graphic, and then operate with additional delta values to "fill-in" the blended-graphic outline or provide a derived mask.

Examples of different directions corresponding to additional BTD embodiments are depicted in image frame 710. In general, BTD direction is only limited as to be within the image plane. By way of example and not limitation, BTD embodiments having horizontal 720 and 740, vertical 730, and diagonal 750 directions are depicted. In the general case, for each available direction there exists a corresponding available opposite direction. In addition, a BTD is not limited to scanning over all $(i,j)$ locations of an image, as a BTD can be applied to any one or more locations.

In some embodiments, mask boundaries and/or a more complete mask of the logo can be derived by selecting pixels that are known or discovered to be within the logo (by detection and/or any other known and/or convenient technique and/or method) and selectively modifying of the $\delta$ value until a non-positive result is obtained. By way of non-limiting example, upon detection of a positive indication of the presence of a logo, one or more anchor pixels can be established. A $\delta$ valve can then be incremented (or in some embodiments decremented) by a desired value and the result can be re-evaluated for presence of a positive indication of a logo. The $\delta$ value associated with the anchor pixel can be repeatedly incremented and the result re-evaluated for the presence of a positive indication of a logo. At the point that the incremented $\delta$ value yields a non-positive determination for logo presence, a subsequent anchor pixel can be selected and the process of incrementing (or decrementing) the $\delta$ value can be repeated in the same or a similar manner as described herein. This system, method and/or process can result in not only identification of the boundaries of the logo mask, but can also more completely define the interior of the logo mask and can assist in differentiating between solid and transparent graphics.

In some embodiments, the screen can be divided into regions for reduced complexity and reduced false results. By way of non-limiting example, if a user only desired search for logos in the lower right corner of a screen, a user could compute the detector outputs for the region of interest. Alternately, a user could evaluate previous frames and use the detector outputs from one or more previous frames to narrow the regions processed in a subsequent frame.

The disclosure contained herein is not intended to be limited to traditional logos, but can also be implemented with any known, convenient and/or desired graphic element.

Figure 8:
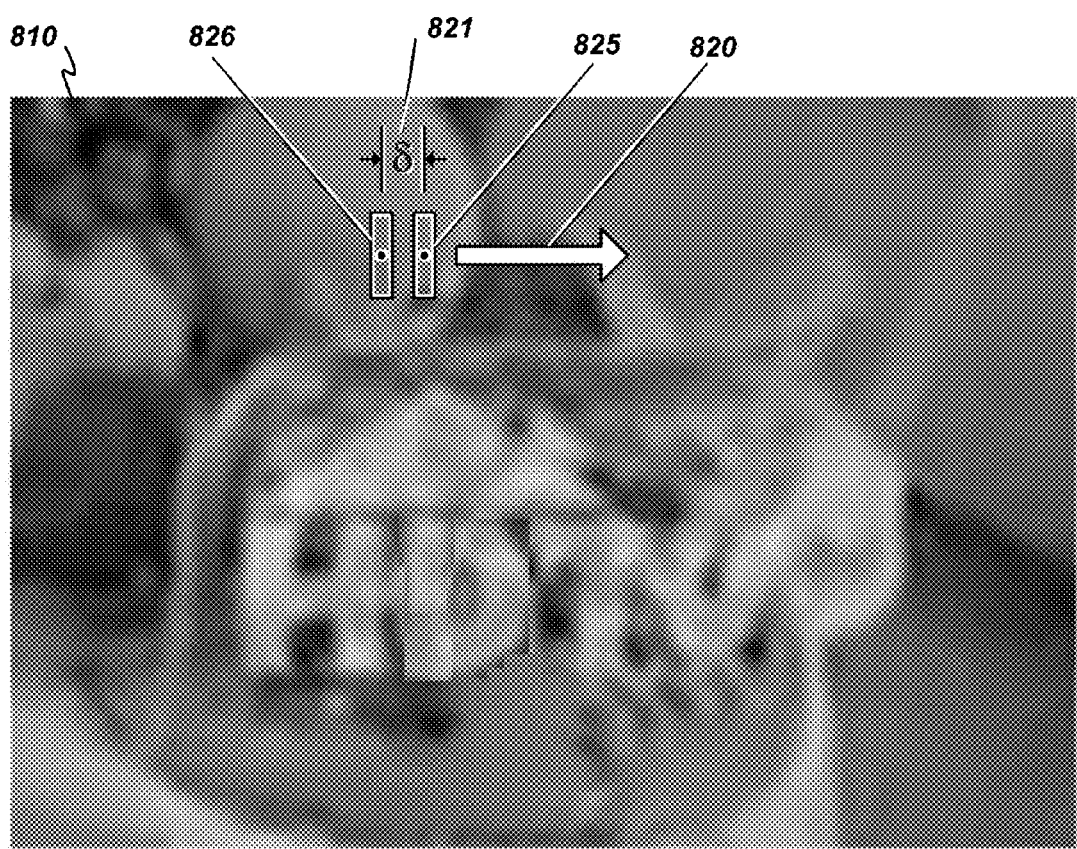
FIG. 8 depicts a blended transition detector.

FIG. 8 depicts a BTD embodiment. A BTD having a horizontal direction 820 is shown within the image frame 810. The image provided is a representative example of at least a portion of a broadcast television image. Region 825 comprises a pixel location (i,j) and some additional pixel locations distributed equally on either side of location (i,j) and orthogonal to the direction of the BTD. P(i,j) can be evaluated as a filtered pixel by spatial averaging of the pixels in Region 825.

Region 826 comprises the offset pixel location (i',j') and some additional pixel locations distributed equally on either side of location (i',j') and orthogonal to the direction of the BTD. The pixel location (i',j') within 826 is located a specified distance δ 821 from image pixel location (i,j) along the specified horizontal direction 820 corresponding to this BTD. $\hat{P}_b(i,j)=P(i',j')$ can be evaluated as a filtered pixel by spatial averaging of the pixels in Region 826.

A plurality of BTDs with distinct directions can operate on the same image. The corresponding results of the BTD operations, such as per-pixel results, can be combined. By way of example and not limitation, in some embodiments the results can be combined by evaluating a logical OR operation on a per-pixel basis, wherein the inputs to the OR operation are the per-pixel, results from the BTDs, and the output can be a per-pixel combined result. In some embodiments, the combined result can provide an outline of graphics, such as logos, if the overlay-blended graphic is present in the image frame.

Figure 9:
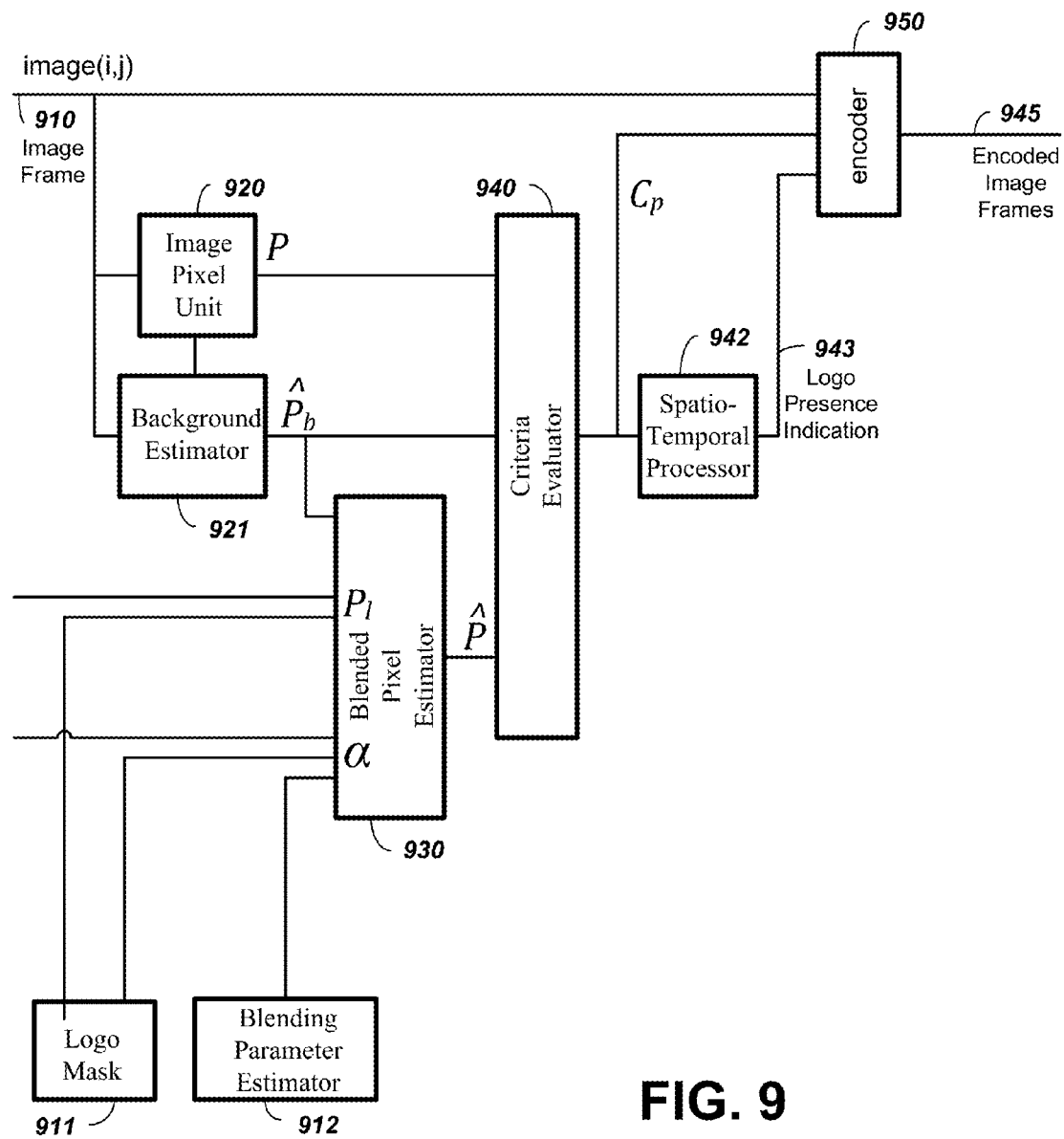
FIG. 9 depicts a block diagram of components used to provide embodiment.

FIG. 9 depicts a block diagram embodiment applicable to systems and methods herein described. It can be appreciated that this is an aggregated view of functionality across several embodiments. Specific embodiments can vary from the specific form of FIG. 9 without departing from the scope of the disclosure.

One or more image frames 910 can be received by image pixel unit 920. Image pixel unit 920 can provide image pixel value(s) P, responsive to the image frames 910 received. In some embodiments, image pixel unit 920 processes received image frames 910. Such processing can comprise, by way of non-limiting examples, spatial filtering, temporal filtering, and morphological functions.

One or more image frames 910 can be received by background estimator 921. Background estimator 921 can provide estimated background pixel value(s) $\hat{P}_b$, responsive to the image frames 910 received. In some embodiments, background estimator 921 processes received image frames 910. Such processing can comprise, by way of non-limiting example, spatial filtering.

Some embodiments can model a background pixel value of an alpha-blended pixel by a rearranged version of Eqn. 1:

$$P_b(i,j) = \frac{P(i,j) - \alpha P_l(i,j)}{1-\alpha} \qquad \text{Eqn. 1(rearranged)}$$

Since this relationship provides the background pixel value that is at least partially obscured behind an overlay-blended graphic, it can be referred to as de-alpha-blending.

In some embodiments a pixel at (i,j) can be postulated to be within a blended graphic while a pixel at (i',j') can be postulated to be outside a blended graphic. Then the pixel at (i,j) can be de-alpha-blended and the result compared to the actual pixel value at (i',j'), If the value of the de-alpha-blended pixel at (i,j) is closer to the value of the pixel at (i',j') than the value of the pixel at (i,j), then the pixel at (i,j) can be identified as a overlay-blended pixel. In some embodiments, the identification can additionally be subject to satisfying a tolerance constraint, such as: the value of the de-alpha-blended pixel at (i,j) must be less than the pixel value at (i',j') plus a tolerance value, and/or the value of the de-alpha-blended pixel at (i,j) must be greater than the pixel value at (i',j') minus a tolerance value.

Some embodiments can use the way the background pixel value varies with the alpha-blended value to form predict a de-alpha-blended pixel value. From FIG. 3, Eqn. 1, or Eqn. 3, it can be determined that as the value of the alpha-blended pixel increases or becomes brighter (along vertical axis 315), the difference between the background and blended pixel values decreases in a linear fashion. Also, it can be determined that the background pixel value is less than or equal to the blended pixel value. These characteristics can be used to form a predicted background pixel value for a pixel in one region from a pixel in another region. Note that FIG. 3 is plotted for a $P_l$ of 255. For smaller values of $P_l$, the blended pixel curve can cross the axis vs. axis curve 316 and be below it for large background pixel values. In this case, the background pixel value will still be smaller than the blended pixel value for blended pixel values less than a certain value, but greater than the blended pixel values for blended pixel values above the certain value. The certain value can be referred to as a crossover value. Above the crossover value, the difference in value between the blended and background pixels will increase in a linear fashion.

In some embodiments a blending parameter estimator 912 can estimate blending parameter value(s) α.

In some embodiments, a logo mask 911 is known. In some embodiments a logo mask 911 can be explicitly specified. In some embodiments a logo mask can be derived from operations. In some embodiments, a logo mask can comprise one or more of location information, shape information, logo pixel value $P_l$ information, and/or blending parameter value α information.

Blended pixel estimator 930 can receive estimated background pixel value(s) $\hat{P}_b$, logo pixel value(s) $P_l$, and blending parameter value(s) α. Blended pixel estimator 930 can provide estimated blended pixel value(s) $\hat{P}$ responsive to the received $\hat{P}_b$, $P_l$, and α values. In some embodiments, $\hat{P}$ can be estimated according to Eqn. 3. In some embodiments, $\hat{P}$ can be estimated according to Eqn. 5a or Eqn. 5b.

Criterion evaluator 940 can receive estimated background pixel value(s) $\hat{P}_b$, logo pixel value(s) $P_l$, and estimated blended pixel value(s) $\hat{P}$. Criterion evaluator 940 can evaluate an overlay-blended graphic presence criterion to provide an indication of overlay-blended graphic presence, such as overlay-blended graphic presence indicator value(s) $C_p$, responsive to the received $\hat{P}_b$, $P_l$, and $\hat{P}$ values. In some embodiments, an overlay-blended graphic presence criterion is evaluated according to Eqn. 4. For cases where a predetermined logo mask is used as part of determining $C_p$, a positive value of $C_p$ may indicate the presence of the logo specified by the mask.

Spatio-temporal processor 942 can receive an indication of overlay-blended graphic presence such as overlay-blended graphic presence indicator $C_p$. In some embodiments, spatio-temporal processor 942 can receive $C_p$ along with its corresponding (i,j) position for each location in the image. In some embodiments, spatio-temporal processor 942 provides temporal filtering and/or morphological operations as described herein in relation to particular embodiments. Spatio-temporal processor 942 can thereby provide a processed indication of logo presence 943. For embodiments using one or more BTD(s), positive values of $C_p$ will typically occur along the edges of an overlay-blended logo. In some embodiments, the set of positive $C_p$ locations can then be further processed to determine whether a logo is present. As an example and without limitation, the positive $C_p$ locations can be represented in a binary image having the same dimensions as the image being analyzed, where non-positive $C_p$ locations are represented by a 0 and positive $C_p$ locations are represented by a 1. As an example and without limitation, morphological operations, such as a closing operation followed by an opening operation, can be applied to the binary image to eliminate noisy isolated positive responses and fill-in regions with several nearby positive responses, and the presence of such a filled-in region after morphological processing may indicate the presence of a logo or other graphics objects.

An encoder 950 can receive an indication of overlay-blended graphic presence such as $C_p$, a processed indication of logo presence such as provided by a spatio-temporal processor 942, and one or more image frames 910. An encoder can provide encoded image frames 945. A process of encoding received image frames 910 can be responsive to an indication of overlay-blended graphic presence such as $C_p$, a processed indication of logo presence 943 such as provided by a spatial-temporal processor 942, and the received image frames 910. As an example and without limitation, encoder 950 may allocate more bits or a higher encoding quality target to a portion of the input image containing a group of overlay-blended pixels or a positive logo presence indication.

Figure 10:
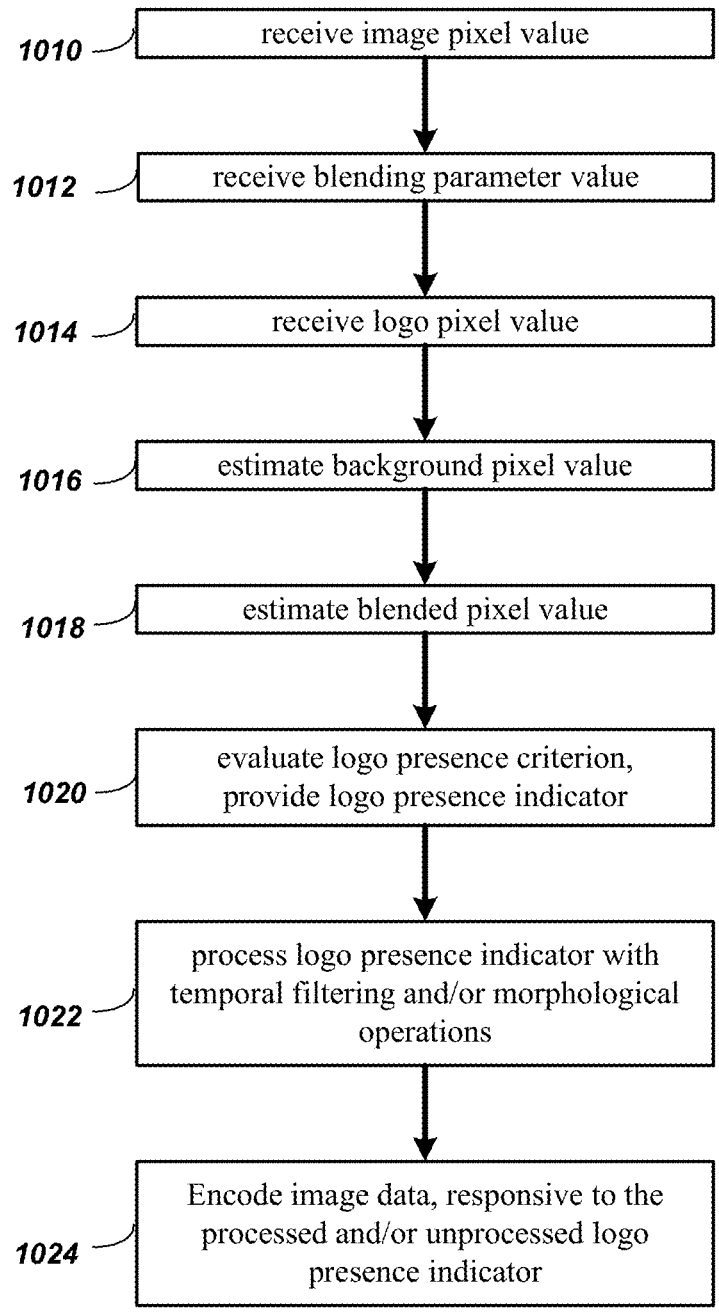
FIG. 10 depicts a flow chart illustrating operation of embodiments.

FIG. 10 depicts a flow chart embodiment applicable to systems and methods herein described. It can be appreciated that this is an aggregated view of functionality across several embodiments. Specific embodiments can vary from the specific form of FIG. 10 without departing from the scope of the disclosure.

In step 1010, image pixel values P can be received, such as those that comprise an image frame. In step 1012, blending parameter value(s) α can then be received. In step 1014, logo pixel value(s) $P_l$ can further be received.

Next pixel estimates are made. In step 1016, background pixel value(s) $P_b$ are be estimated, as $\hat{P}_b$. In step 1018, blended pixel value(s) P can be estimated, as $\hat{P}$. In step 1020, an overlay-blended graphic presence criterion can then be evaluated. In response to the evaluation, an overlay-blended graphic presence indicator, such as $C_p$, and a logo presence indication can be provided. In some embodiments, in step 1022, an overlay-blended graphic presence indicator, such as $C_p$, can be processed. The processing can comprise temporal filtering and/or morphological operations. In some embodiments, in step 1024, image data such as image pixel values received (above) can be encoded, thereby providing encoded image frames. The encoding can be responsive to an overlay-blended graphic presence indicator such as Cp and/or responsive to a processed logo presence indicator.

Figure 11A:
FIGS. 11a-11b depict an example input image and processed image.
Figure 11B:
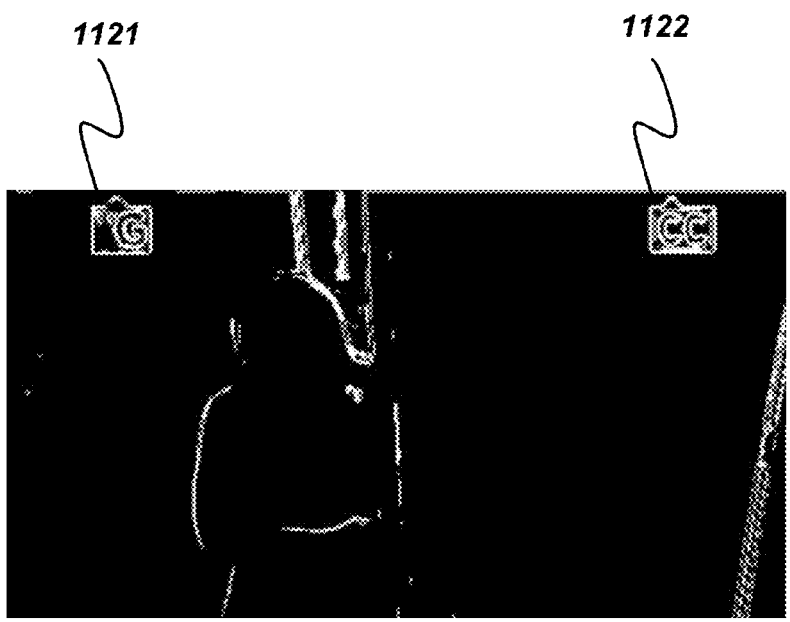

FIG. 11a depicts an example combined image and FIG. 11b represents a processed version of the image of FIG. 11a. The combined image includes overlay-blended graphics elements as identified at locations 1111 and 1112. The processed image of FIG. 11a displays the combined results of several BTD operations on the combined image of FIG. 11a. BTDs corresponding to (two) horizontal and (two) vertical directions operated on the combined image 10010. That is, the BTD directions comprised: left to right, right to left, top to bottom, and, bottom to top. The results of the BTD operations were combined with a logical OR operation as described herein. The processed image of FIG. 11b displays the per-pixel combined results. Notably, outlines of imposed graphic elements are visible at locations 1121 and 1122, corresponding respectively to the blended graphics at locations 1111 and 1112 within the combined image 1110.

In some embodiments, the results of BTD operations on an image, such as a combined image, may indicate transitions at some pixel locations that do not correspond to imposed graphics, such as logos. The results can be refined through the application of temporal filtering and/or morphological operations. In some embodiments, the temporal filtering and/or morphological operations can be advantageously applied to the image, such as the combined image, and/or to the results of the BTD operations, such as to the combined result of several BTD operations on an image.

Temporal filtering operations can comprise, by way of example and not limitation, time decimation of the frames of a source video image stream, and, an averaging filter applied to the time-decimated pixels. By way of example and not limitation, an input source stream having a frame rate of 30 frames per second can be decimated to 1 frame per second. The decimated frames of image pixels can then be averaged with a recursive single-pole filter, wherein the contribution of a current frame image pixel value contributes 10% to the average value of the image pixel value.

Morphological operations, as are well known in the image processing arts, can follow and/or otherwise be combined with temporal operations, such as the filtering operations described supra. Morphological operations can comprise, by way of example and not limitation, a closing operation, and/or an opening operation.

In some embodiments, a closing operation, followed by an opening operation, can be performed subsequent to decimation and filtering operations.

In some embodiments as depicted in FIG. 9, image pixel unit 920 can apply time decimation and/or filtering to images and/or image streams 910. In some embodiments as depicted in FIG. 9, spatio-temporal processor 942 can provide morphological operations to the results of BTD and/or other processing upon image frames. In some embodiments, image pixel values, P, 920 can be temporally averaged independently from estimated background pixel values, $\hat{P}_b$, 921, which can be temporally averaged. However in alternate embodiments, image pixel values, P, 920 can be collectively temporally averaged with estimated background pixel values, $\hat{P}_b$, 921.

In some embodiments, a derived graphic/logo mask can be determined based on temporal averaging and/or thresholding of image data. When a graphic is determined to be persistently present over several video frames, temporal averaging of the frames to provide an averaged image can advantageously reduce the contribution of the non-graphic pixels to the averaged image. If the image data is based on luminance values, the luminance of graphic pixels in the averaged image can be higher than that of the non-graphic pixels. Thresholding the averaged image based on a luminance threshold can identify a derived graphic mask. That is, in some embodiments pixel locations having a luminance value above outside a threshold can be determined to be part of the derived graphic mask. The threshold value can be fixed or can be determined based on characteristics of the pixels, such as spatial average value of some of the pixels, deriving the threshold based on Otsu's method and/or based on any other known, convenient or desired characteristic and/or characteristics.

In some embodiments, an image cutout region can be predetermined based on knowledge of where blended-graphics can or are likely to be present, or can be determined by identifying a region that has positive BTD results over multiple (although not necessarily consecutive) frames. Temporal averaging and/or thresholding can then, in some embodiments, be limited to the image cutout region. In some embodiments, temporal averaging can be controlled by characteristics of the pixels such as the luminance of an image and/or image region can be spatially averaged and compared to a luminance threshold. In alternate embodiments any other known and/or convenient pixel characteristic and/or concatenated statistical pixel characteristic can be compared. If the threshold is not exceeded, the image can be excluded from the averaging process.

Figure 12A:
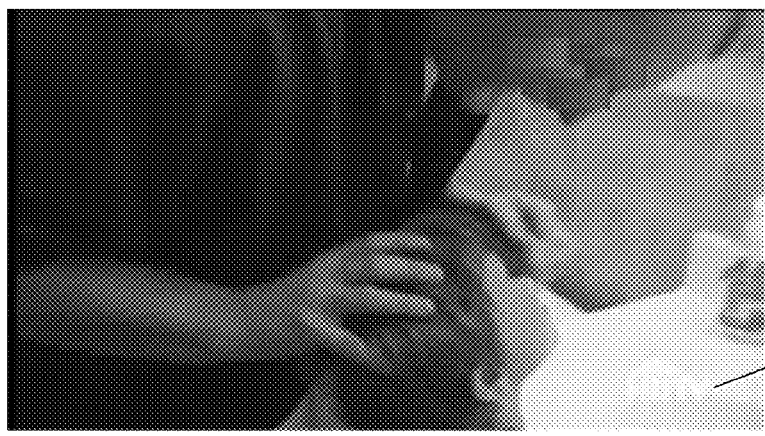
FIGS. 12a-12b depict another example input image and processed image.
Figure 12B:

FIG. 12a depicts another example combined image, while FIG. 12b depicts a processed image. The combined image of FIG. 12a comprises blended a graphic element as identified at location 1211. The processed image of FIG. 12b displays the combined results of several BTD operations on the combined image of FIG. 12a. BTDs corresponding to (two) horizontal and (two) vertical directions operated on the combined image of FIG. 12a. That is, the BTD directions comprised: left to right, right to left, top to bottom, and, bottom to top. The results of the BTD operations were combined with a logical OR operation as described herein. The processed image of FIG. 12b displays the per-pixel combined results. Notably, outlines of an imposed graphic element is visible at locations 1221, corresponding respectively to the blended graphic at locations 1211 within the combined image of FIG. 12a.

Figure 13A:
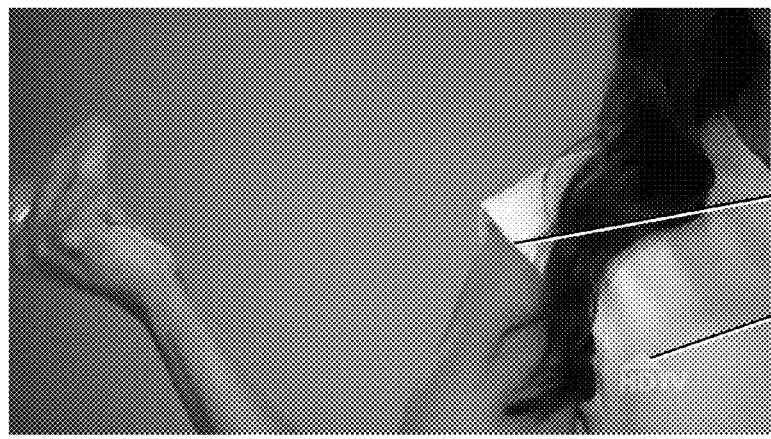
FIGS. 13a-13c depicts an example input image, and first and second processed images.
Figure 13B:
Figure 13C:

FIG. 13a depicts another example combined image 1310, while FIG. 13b shows a first processed image, and FIG. 13c shows a second processed image 1330. The combined image of FIG. 13a includes a graphic element as identified at location 1311. The combined image represents a current frame within a 30 frames-per-second stream of image frames.

The first processed image of FIG. 13b depicts the results of decimating and filtering the stream of source image frames, and application of BTD operations on the decimated and filtered current frame. The decimated and filtered current frame is not shown. The decimation and filtering is applied as described supra. It can be appreciated that the first processed image of FIG. 13b thereby depicts a current first processed image within a stream of first processed images resulting from the temporal operations on the stream of source image frames. The second processed image of FIG. 13c displays a current result of morphological operations on the stream of first processed images. The morphological operations are applied as described supra.

In FIGS. 13a-c, an imposed graphic element can be identified at location 1321 within the first processed image of FIG. 13b, and at location 1331 within the second processed image of FIG. 13c, corresponding respectively to the blended graphic at location 1311 within the combined image of FIG. 13a.

Notably, first processed image of FIG. 13b indicates transitions at some pixel locations 1322 that do not correspond to imposed graphics, such as logos, at the corresponding location 1312 within the source combined image of FIG. 13a. The second processed image of FIG. 13c does not indicate imposed graphics at location 1332, corresponding to the indication at location 1322 within first processed image of FIG. 13b. Thus the combined sequence of operations has successfully refined the results.

Combination of Case 1 and Case 2:

In some embodiments, Case 1 and Case 2 operations can be combined. Some such embodiments can support identification of graphics, such as a logo, presence on a frame-by-frame basis. The location and outline of a logo mask that is not identified can be obtained from Case 2 operations on a stream of images, as herein described. Such a logo mask can be described as a derived logo mask.

In some embodiments, the Case 2 operations can be applied over a large number of image frames from a stream of image frames. By way of example and not limitation, such operations can be applied to frames corresponding to a time duration of seconds, or minutes, upon an image stream having a frame rate of 30 frames per second.

In some embodiments, Case 1 operations can be applied on individual image frames from the stream of image frames, by employing the identified logo mask. Such operations can provide an indication of logo presence on a frame-by-frame basis. Notably, the Case 1 operations can be applied to individual image frames that have not been averaged with other frames from the stream of image frames.

In some embodiments, Case 2 operations can be applied on individual image frames from the stream of image frames. Results from these Case 2 operations on individual frames can be compared with the derived logo mask. The comparison can comprise a measure of similarity. By way of example and not limitation, such a measure can be compared against a specified threshold and the result can provide an indication of logo presence on a frame-by-frame basis.

In some embodiments, if the presence of and/or the logo is unknown at the commencement of processing, the systems, methods and/or apparatus described herein can be used to identify the presence, location and/or mask for a logo. After the mask and/or location for a logo is identified, the system, method and/or apparatus can use the mask for the identified logo to process using alternate systems, methods, techniques and/or apparatus that can be employed with known and/or identified masks. Accordingly, previously unknown and/or previously known logo masks can be defined and frame-by-frame processing of images can be processed based upon the defined mask and their presence within the image readily identified.

Embodiments of combined Case 1 and Case 2 operations can provide some notably advantageous features that can comprise, by way of example and not limitation: (1) Providing a frame-by-frame logo presence indicator, suitable for use by encoding processes. (2) Automatically generating a logo mask, thereby eliminating a need to provide the mask by other means such as explicit specification. (3) Adapting to changes in logo mask location within an image frame, and adapting to changes in the corresponding content, that is, the design, of a graphic element, such as a logo.

Solid Graphics:

In some embodiments, the identification of a graphic element that comprises a filled region, which can be described as a solid graphic, can be supported by refining the results of BTD operations through the application of temporal filtering and/or morphological operations. The results can be refined through the application of temporal filtering and/or morphological operations, as described supra.

Figure 14A:
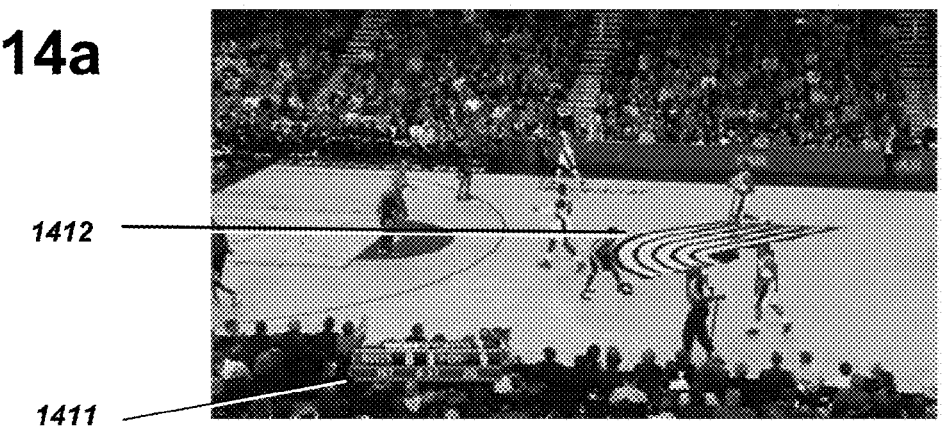
Figure 14B:
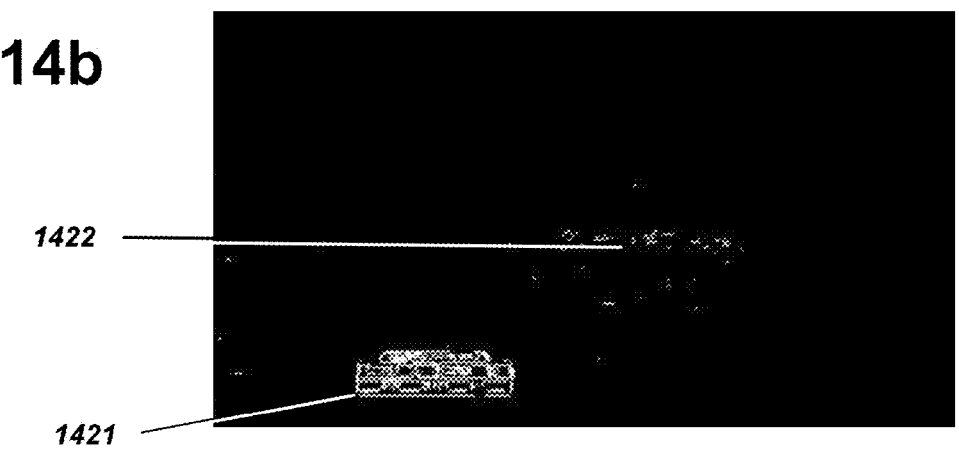
Figure 14C:
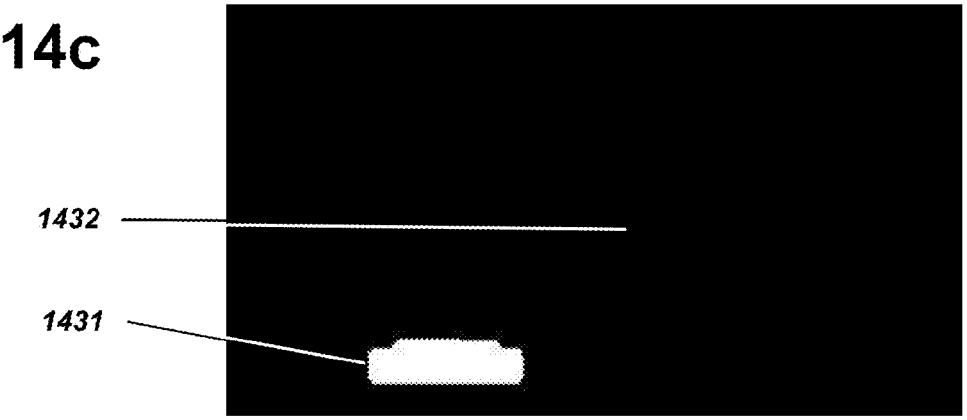

FIG. 14a depicts an example combined image, while FIG. 14b shows a first processed image, and FIG. 14c shows a second processed image. The combined image of FIG. 14a includes a graphic element as identified at location 1411.

The combined image represents a current frame within a 30 frames-per-second stream of image frames.

The first processed image of FIG. 14b depicts the results of decimating and filtering the stream of source image frames, and application of BTD operations on the decimated and filtered current frame. The decimated and filtered current frame is not shown. The decimation and filtering is applied as described supra. It can be appreciated that the first processed image of FIG. 14b thereby depicts a current first processed image within a stream of first processed images resulting from the temporal operations on the stream of source image frames.

The second processed image of FIG. 14c displays a current result of morphological operations on the stream of first processed images. The morphological operations are applied as described supra.

An imposed graphic element can be identified at location 1421 within the first processed image of FIG. 14b, and at location 1431 within the second processed image FIG. 14c, corresponding respectively to the blended graphic at locations 1411 within the combined image of FIG. 14a.

Notably, first processed image of FIG. 14b also indicates transitions at some pixel locations 1422 that do not correspond to imposed graphics, such as logos, at the corresponding location 1412 within the source combined image of FIG. 14a. The second processed image of FIG. 14b does not indicate imposed graphics at location 1432, corresponding to the indication at location 1422 within first processed image of FIG. 14b. Thus the combined sequence of operations has successfully refined the results. Further the combination of operations has identified the imposed graphic 1431 comprising a filled region, that is, a solid graphic.

Figure 15:
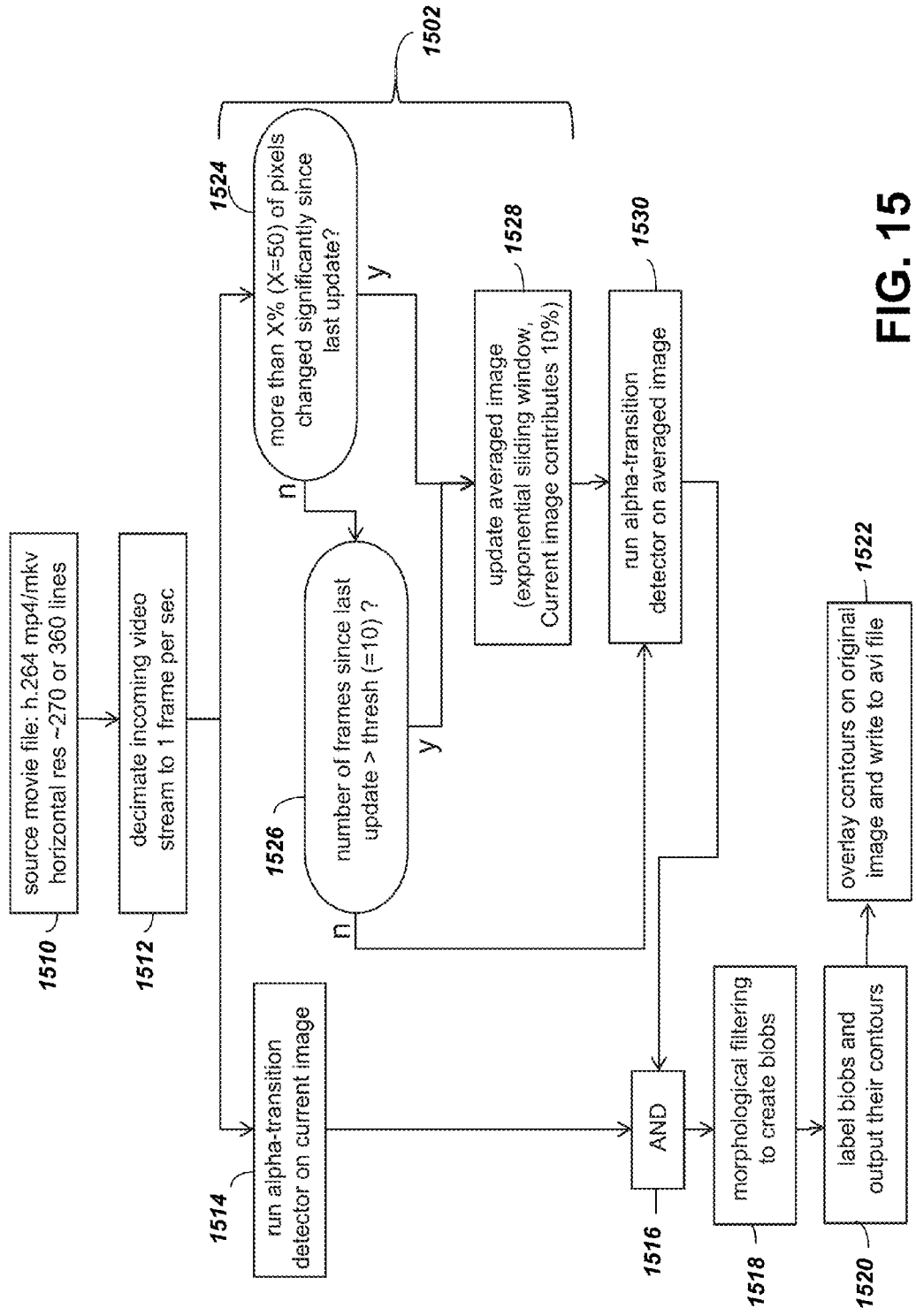
FIG. 15 depicts a flow chart embodiment.

FIG. 15 depicts a flow chart embodiment of a logo detector process. Such embodiments can utilize Case 2 BTD operations. The embodiments can identify spatial transitions from non-blended to blended pixels, within image frames. The embodiments can be responsive to imposed graphic elements such as semi-transparent logos and/or other forms of imposed graphics. The embodiments can be responsive to imposed graphics that are somewhat persistent, and can be so responsive for backgrounds that are static or somewhat dynamic. Absent an available logo mask, BTD and other operations in combination can apply temporal averaging to identify somewhat persistent graphics and to generate a region-of-interest mask. The embodiments can support frame-by-frame analysis to identify graphics presence in a current image frame. Such identification of graphics presence in a current frame can be filtered by a region-of-interest mask.

The operation begins in step 1510, with a source movie file comprising a stream of image frames that can be provided. By way of example and not limitation, the source movie file can have characteristics: h.264 mp4/mkv, horizontal res ~270 or 360 lines. In step 1512, the provided source stream can be decimated from a higher frame rate representation to a lower frame rate representation. In some embodiments, the lower frame rate representation comprises a stream of image frames corresponding to a frame rate of 1 frame per second.

In step 1514, in one path from operation 1512, BTD operations can be applied on a current image frame. In step 1516 the results of steps 1514 and 1530 can be logically combined with an AND operation. In step 1518, morphological filtering can be applied to the results of step 1516, thereby creating blobs. In step 1520, blobs received from step 1518 can be labeled, and contours of the blobs can be provided to subsequent processes. In step 1522, the provided contours of blobs can be overlaid on an original image frame, and the combined result can be written to a file, such as an avi file. This step does not need to be performed unless it is desired to create an archive or demonstration video of the results produced by the process.

In step 1524, in a second path from step 1512, a determination can be made that more than X% (X=50) of pixels in an averaged image frame have changed significantly since a previous update. If that determination is logically true, control flow can proceed to step 1528, otherwise control flow can proceed to step 1526. In step 1526 a determination can be made that the number of frames since a last update is greater than a specified threshold. In some embodiments, the threshold can be specified as 10. If the determination is logically true, control flow can proceed to step 1528, otherwise control flow can proceed to step 1530. In step 1528 an averaged image can be updated according to specified averaging characteristics. In some embodiments the characteristics can comprise: exponential sliding window, and, the current image contributes 10%. In step 1530 BTD operations can be applied on an averaged image frame.

A change-gated temporal averaging process 1502 comprises specific operations and control flow within the diagram 1501. The specific operations can comprise steps 1524, 1526 and 1528 and the specific flow control can comprise the herein described control flow corresponding to those steps.

Blending parameter value estimation:

In some embodiments, the value(s) of blending parameter α can be estimated. Solving Eqn. 1 for α yields:

$$\alpha = \frac{P - P_b}{P_l - P_b} \qquad \text{Eqn. 6}$$

An estimate of the blending parameter $\alpha_\mathrm{E} \approx \alpha$ can be developed by providing values for P, $P_b$, and $P_l$ to a computation of Eqn. 6. Subsequent to the identification of an on-screen graphic mask, such as a logo mask, these values can be provided as described herein.

In some embodiments, the value of the alpha-blending parameter can be estimated. By way of non-limiting example, an image can be analyzed to determine if a graphic is present within a region specified by a mask (either predefined or derived). If so, the alpha value can be estimated based on Eqn. 6, with P provided by one or more pixels from the region and $P_b$ provided by one or more pixels outside the region. In some embodiments, the image used for estimating the alpha value can be a temporally averaged image.

The value(s) of P can be a function of the values of some image pixels located within the location of the mask, within an image. Thus P can be evaluated and a value provided, by methods herein described, such as by way of example and not limitation, spatial averaging over a selected region within the location of the mask, within the image.

The value(s) of $P_b$ can be a function of the values of some image pixels located outside the location of the mask, within an image. Thus $P_b$ can be evaluated and a value provided, by methods herein described, such as by way of example and not limitation, spatial averaging over a selected region outside the location of the mask, within the image.

The value(s) of $P_l$ can correspond to the pixel values of a graphic before the graphic is overlay-blended onto another image, such as a logo, pixels. In some embodiments, these values can be assumed to be at a maximum in the corresponding operating range.

In some embodiments, the estimated blending parameter value(s) $\alpha\bar{\bar{e}}$ can be provided and/or used in place of an explicitly and/or otherwise provided blending parameter value(s) $\alpha$.

In the diagram of FIG. 9, a blending parameter estimator 912 can provide estimated blending parameter value(s) $\alpha\bar{\bar{e}}$, as described herein. Blended pixel estimator 930 can receive and operate responsively to the $\alpha\bar{\bar{e}}$ value, as it does/would for explicitly and/or otherwise provided blending parameter value(s) $\alpha$.

In some embodiments, after an on-screen graphic mask has been estimated/derived, the system can estimate the value of the blending parameter alpha by examining some pixels inside the mask and outside the mask and treating the pixels outside the mask as background pixels and those inside the mask as alpha-blended pixels, the system can estimate the value of alpha by rearranging the original alpha-blending equation as follows:

$$P = (1-\alpha)P_b + \alpha P_l$$
$$P - P_b = -\alpha P_b + \alpha P_l$$
$$\frac{P-P_b}{P_l-P_b} = \hat{\alpha}$$

Where P is a function of some pixels inside the mask, such as average intensity and/or any other known and/or desired pixel characteristic, Pb is a function of some pixels outside the mask, and Pl is the value of logo pixels prior to the alpha-blending process. In some embodiments Pl can be assumed to be white, or intensity of 255. However in alternate embodiments any known, convenient and/or desired property(ies) and/or characteristic(s) whether uniform or non-uniform can be used.

In some embodiments, while logos may appear to the eye to be stationary within a frame, there can be some actual, but visually imperceptible changes in logo position from frame to frame. Moreover logo position between programs, while somewhat fixed in location within a frame, can vary in location. Accordingly, in some embodiments, a bounding box and/or cutout regions can be employed in the location where a logo is anticipated to occur and/or in a location where a previous logo occurred and/or in any known, convenient and/or desired location within a frame. In some embodiments the bounding box and/or cutout region can be larger than the anticipated logo, such that the logo can vary in location within the bounding box and/or cutout region, but can still be wholly and/or substantially contained within the bounding box and/or cutout region. In some embodiments, the initial area where a logo is expected to occur can be based on the output of the Blended Transition Detector on a current frame, an averaged frame, a combination of the two or trends such as the consistency of the BTD output results over time.

In some embodiments if the overall brightness and/or variation of the pixels in the bounding box and/or cutout region is low and/or below a prescribed threshold, then the identified pixels can be added to a temporal accumulator and subsequently evaluated. When a prescribed number of frames have been passed to the temporal accumulator and/or when an alternate prescribed threshold is reached, a logo mask can be generated from the data in the temporal accumulator by binary thresholding and/or any known and/or convenient system, method and/or apparatus. In some embodiments, the defined logo mask position can be used as a reference to reposition the original logo mask within the frame and/or within the bounding box and/or cutout region for future detection. This can result in improved logo presence detection and increased performance over alternate techniques such as correlation of multiple spatial shifts based on frame-by-frame evaluations. In alternate embodiments, the defined logo mask and position can be used in for subsequent determination of logo presence, if a previously-defined logo mask was unknown and/or unavailable.

In some embodiments, the results, outputs, or determinations of the methods described herein can be used to influence the operations of video processing equipment that include video encoders and/or transcoders. By way of non-limiting example, a video encoder can determine or modify its operating parameters such as quantization step sizes, coding unit size, transform unit size, and macroblock modes based on the presence and location or region of a blended-graphic being provided or signaled to the encoder. Additionally by way of non-limiting example, the encoder can determine its operating parameters so as to target a higher quality of encoded video output for regions indicated as containing overlaid graphics. Some embodiments can provide an estimated value of an alpha-blending parameter to the video processing equipment. Some embodiments can provide an estimated or derived blended-graphic/logo mask to the video processing equipment.

Figure 16:
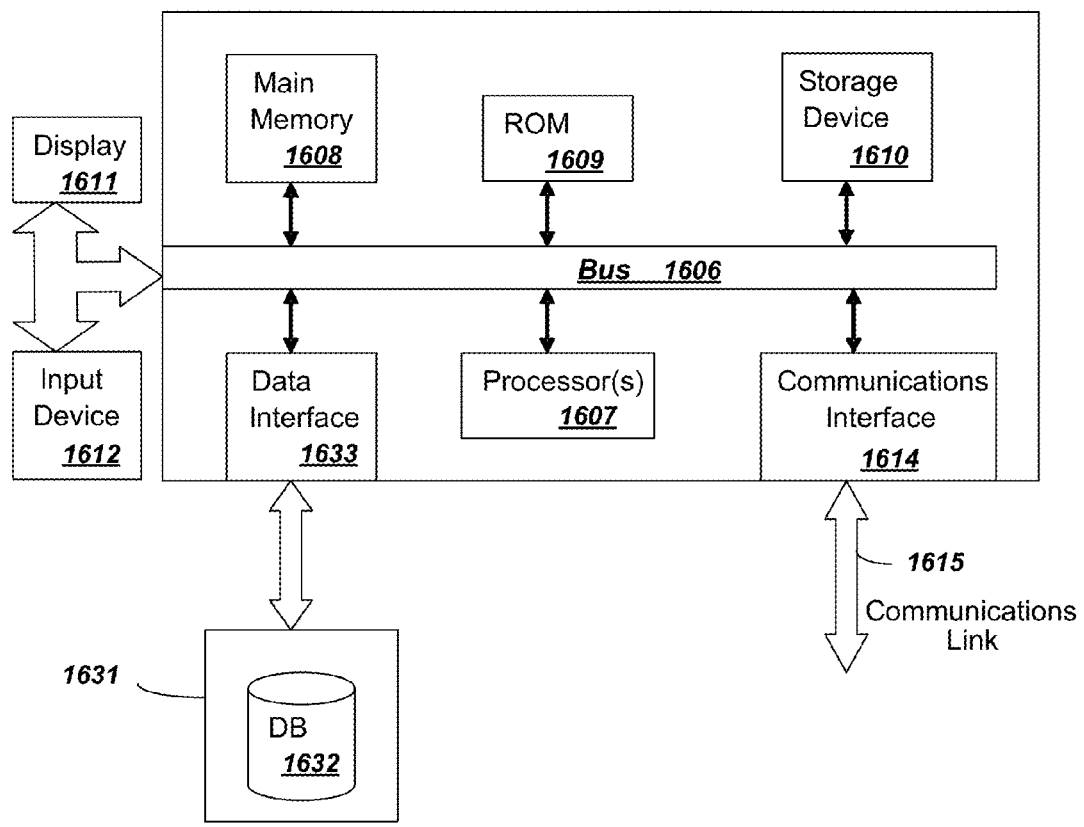
FIG. 16 depicts a computing system embodiment.

The execution of the sequences of instructions required to practice the embodiments can be performed by a computer system of FIG. 16. The computer system provides a block diagram of functional components that can be used to enable embodiments of the present invention. As used herein, the term computer system is broadly used to describe any computing device that can store and independently run one or more programs.

Each computer system of FIG. 16 may include a communication interface 1614 coupled to the bus 1606. The communication interface 1614 provides two-way communication between computer systems, such as shown in FIG. 16. A communication link 1615 links one computer system with another. For example, the communication link 1615 may be a LAN, an integrated services digital network (ISDN) card or a modem, or the communication link 1615 connected to the Internet, in which case the communication interface 1614 may be a dial-up, cable or wireless modem.

A computer system of FIG. 16 may transmit and receive messages, data, and instructions, including program or code, through its respective communication link 1615 and communication interface 1614. Received program code may be executed by the respective processor(s) 1607 as it is received, and/or stored in the ROM 1609 or other storage device 1610 for later execution.

In an embodiment, the computer system of FIG. 16 operates in conjunction with a data storage system 1631 that contains a database 1632. The computer system of FIG. 16 communicates with the data storage system 1631 through a data interface 1633. A data interface 1633, which is coupled to the bus 1606, transmits and receives electrical, electromagnetic or optical signals.

Computer system of FIG. 16 includes a bus 1606 or other communication mechanism for communicating instructions, messages and data, collectively, information, and one or more processors 1607 coupled with the bus 1606 for processing information. Computer system also includes a main memory 1608, such as a random access memory (RAM) or other dynamic storage device, coupled to the bus 1606 for storing dynamic data and instructions to be executed by the processor(s) 1607. The main memory 1608 also may be used for storing temporary data, i.e., variables, or other intermediate information during execution of instructions by the processor(s) 1607.

A computer system of FIG. 16 may be coupled via the bus 1606 to a display device 1611, such as, but not limited to, a cathode ray tube (CRT), for displaying information to a user. An input device 1612, e.g., alphanumeric and other keys, is coupled to the bus 1606 for communicating information and command selections to the processor(s) 1607.

Although the present system, method and apparatus has been described above with particularity, this was merely to teach one of ordinary skill in the art how to make and use the in system, method and/or apparatus. Many additional modifications will fall within the scope of the system, method and/or apparatus, as that scope is defined by the following claims.

What is claimed:

1. A method for detecting overlay graphic presence within a frame of image data comprising:
   specifying a first location corresponding to a pixel location within the frame of image data;
   estimating a background pixel value for the first location, thereby providing an estimated background pixel value, wherein the estimated background pixel value is responsive to one or more image pixel values corresponding respectively to one or more pixel locations that are spatially separate from the first location, and within the frame of image data;
   estimating a blended pixel value for the first location, thereby providing an estimated blended pixel value;
   receiving a first image pixel value for the first location;
   evaluating a graphic presence criterion corresponding to the first location to determine presence of the graphic corresponding to the first location, responsive to:
      the estimated background pixel value,
      the estimated blended pixel value, and
      the first image pixel value,
   to provide a graphic presence indicator value corresponding to the first location; and
   specifying one or more transition directions;
   for each of the one or more transition directions, receiving a corresponding spatial offset value; and
   for each of the one or more transition directions, instantiating a record of the graphic presence indicator value corresponding respectively to one or more pixel locations within the frame of image data;
   wherein the graphic presence criterion is evaluated at the one or more pixel locations within the frame of image data, thereby providing a graphic presence indicator value corresponding respectively to the one or more pixel locations within the frame of image data,
   wherein the estimated background pixel value is further responsive to the each of the one or more transition directions, and
   wherein the estimated background pixel value is further responsive to the spatial offset value corresponding to the each of the one or more transition directions.

2. The method of claim 1, further comprising receiving a blending parameter, wherein the evaluation is also responsive to the blending parameter.

3. The method of claim 1, further comprising receiving a graphic pixel value, wherein the evaluation is also responsive to the graphic pixel value.

4. The method of claim 1, further comprising the steps of:
   receiving a mask, wherein the mask indicates a first specified region corresponding to pixel locations located inside the mask;
   specifying a second specified region comprising pixel locations located outside the mask and located within a third specified region;
   averaging image data values corresponding to pixel locations within the first specified region, thereby forming an average image pixel value; and,
   averaging image data values corresponding to pixel locations within the second specified region, thereby forming an average background pixel value;
   wherein the image pixel value is responsive to the average image pixel value; and
   wherein the estimated background pixel value is responsive to the average background pixel value.

5. The method of claim 1, further comprising the steps of:
   receiving a mask, the mask comprising a mask geometry, and wherein the mask indicates a first specified region corresponding to pixel locations located inside the mask;
   providing a second specified region corresponding to selected pixel locations located inside the mask and responsive to the mask geometry;
   providing a third specified region corresponding to selected pixel locations located outside the mask and responsive to the mask geometry;
   averaging image data values corresponding to pixel locations within the second specified region, thereby forming an average image pixel value; and
   averaging image data values corresponding to pixel locations within the third specified region, thereby forming an average background pixel value;
   wherein the first image pixel value is responsive to the average image pixel value, and
   wherein the estimated background pixel value is responsive to the average background pixel value.

6. The method of claim 1, further comprising the steps of:
   filtering image data in a first specified neighborhood of the first location and in a direction essentially orthogonal to the each of the one or more transition directions, thereby providing a first filtered image pixel value; and
   filtering image data in a second specified neighborhood and in the direction essentially orthogonal to the each of the one or more transition directions, thereby providing a filtered background pixel value;
   wherein the first image pixel value is responsive to the first filtered image pixel value;
   wherein the estimated background pixel value is further responsive to the filtered background pixel value, and
   wherein the second specified neighborhood is spatially offset from the first location responsive to the each of the one or more transition directions and the spatial offset value corresponding to the each of the one or more transition directions.

7. The method of claim 6, further comprising the step of:
   for each of the one or more transition directions, combining the instantiated record of the graphic presence indicator value corresponding respectively to one or more pixel locations within the frame of image data, thereby forming a combined transition frame of data.

8. The method of claim 6, further comprising the step of:
   for each of the one or more transition directions, combining with a logical OR function the instantiated record of the graphic presence indicator value corresponding respectively to one or more pixel locations within the frame of image data, thereby forming a combined transition frame of data.

\* \* \* \* \*